United States Patent
Chung et al.

(10) Patent No.: US 8,401,542 B2
(45) Date of Patent: Mar. 19, 2013

(54) WIRELESS COMMUNICATION SYSTEM FOR MONITORING PHYSICAL DOWNLINK CONTROL CHANNEL

(75) Inventors: Jae Hoon Chung, Anyang-si (KR); So Yeon Kim, Anyang-si (KR); Eun Jong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 903 days.

(21) Appl. No.: 12/240,134

(22) Filed: Sep. 29, 2008

(65) Prior Publication Data

US 2009/0088148 A1  Apr. 2, 2009

Related U.S. Application Data

(60) Provisional application No. 60/976,140, filed on Sep. 28, 2007, provisional application No. 61/023,440, filed on Jan. 25, 2008, provisional application No. 61/033,725, filed on Mar. 4, 2008, provisional application No. 61/045,970, filed on Apr. 18, 2008.

(30) Foreign Application Priority Data

Sep. 16, 2008  (KR) ........................ 10-2008-0090742

(51) Int. Cl.
*H04W 4/00* (2009.01)
(52) U.S. Cl. ......... 455/423; 455/444; 370/485; 375/426
(58) Field of Classification Search .................. 455/423, 455/444; 375/426
See application file for complete search history.

(56) References Cited

U.S. PATENT DOCUMENTS

| | | | |
|---|---|---|---|
| 6,300,864 B1 * | 10/2001 | Willey | 340/7.43 |
| 6,385,457 B1 * | 5/2002 | Dam et al. | 455/456.2 |
| 7,134,064 B2 | 11/2006 | Kim | |
| 7,162,675 B2 | 1/2007 | Das et al. | |
| 7,461,318 B2 | 12/2008 | Fukae et al. | |
| 2003/0002457 A1 * | 1/2003 | Womack et al. | 370/329 |
| 2003/0086384 A1 | 5/2003 | Kwon et al. | |
| 2004/0142715 A1 * | 7/2004 | Oses | 455/522 |
| 2004/0199814 A1 | 10/2004 | Kim et al. | |
| 2005/0041694 A1 * | 2/2005 | Liu | 370/524 |
| 2005/0068967 A1 * | 3/2005 | Terry et al. | 370/395.52 |
| 2005/0073985 A1 | 4/2005 | Heo et al. | |
| 2005/0163076 A1 | 7/2005 | Vannithamby et al. | |
| 2005/0169203 A1 * | 8/2005 | Sinnarajah et al. | 370/312 |
| 2006/0291403 A1 | 12/2006 | Kahtava et al. | |
| 2007/0061673 A1 | 3/2007 | Pan et al. | |
| 2008/0117891 A1 | 5/2008 | Damnjanovic et al. | |

(Continued)

FOREIGN PATENT DOCUMENTS

| | | |
|---|---|---|
| EP | 1672825 | 6/2006 |
| EP | 2104294 | 9/2009 |

(Continued)

OTHER PUBLICATIONS

Ericsson, "Semi persistent scheduling", 3GPP TSG-RAN WG2 Meeting #55, R2-062859, Oct. 2006, XP050132382.

(Continued)

*Primary Examiner* — Olumide T Ajibade Akonai
*Assistant Examiner* — Edward Zhang
(74) *Attorney, Agent, or Firm* — Lee, Hong, Degerman, Kang & Waimey

(57) ABSTRACT

A method of monitoring a physical downlink control channel (PDCCH) in a wireless communication system is provided. A user equipment monitors a set of PDCCH candidates for a search space in a subframe. The search space includes a common search space monitored by all user equipments in a cell and a UE-specific search space monitored by at least one UE in the cell.

17 Claims, 21 Drawing Sheets

U.S. PATENT DOCUMENTS

2009/0074090 A1* 3/2009 Xu et al. .................. 375/260
2010/0023830 A1* 1/2010 Wengerter et al. ............ 714/748

FOREIGN PATENT DOCUMENTS

| | | |
|---|---|---|
| JP | 2003-333017 | 11/2003 |
| JP | 2006-166438 | 6/2006 |
| JP | 2010-529757 | 8/2010 |
| KR | 10-2006-0077854 | 7/2005 |

OTHER PUBLICATIONS

Samsung, "UE-Specific Search Space," R1-081212, 3GPP TSG RAN WG1 Meeting #52bis, Mar. 2008, XP050109656.

LG Electronics, "Randomization Function for PDCCH search space," R1-081567, 3GPP TSG RAN WG1 #52bis, Mar. 2008, XP050109982.

Editor (Motorola), "Proposed: intra-CCE REG EPRE requirement," R1-081593, 3GPP TSG-RAN WG1 Meeting #52bis, Mar. 2008, XP050110091.

Motorola, "PDCCH Search Space Assignment Hashing Function," R1-081672 (R1-081289), 3GPP TSG-RAN WG1 Meeting #52bis, Mar. 2008, XP050110062.

Samsung, "Compact UL-SCH Assignment in E-UTRA," R1-081217, 3GPP TSG RAN WG1 #52bis, Mar. 2008, XP050109661.

Discussion Moderator (Ericsson), "PDCCH blind decoding—Outcome of offline discussions," R1-081101, Feb. 2008, XP-002542364.

Ericsson, "Summary of email discussion on DL control signaling," R1-081522, TSG-RAN WG1 #52bis, Mar. 2008, XP050109937.

Huawei, "Control Signaling of MBMS Single-cell Transmission," R1-081393, 3GPP TSG-RAN-WG1 Meeting #52bis, Mar. 2008, XP050109811.

Qualcomm Europe, "Remaining issues on PDCCH search space definitions," R1-081481, 3GPP TSG RAN1 #52bis, Mar. 2008, XP050109898.

Nokia et al., "Further discussions on the False Positive Probability for the DL Shared Control Channel", R1-072305, 3GPP TSG RAN WG1 #49, May 2007.

Alcatel-Lucent et al., "CRC Attachment", R1-073852, Agenda Item: 7.3, 3GPP TSG RAN1 #50, Aug. 2007.

Ericsson, "Semi persistent scheduling", R2-062859, TSG-RAN WG2 Meeting #55, Oct. 2006.

Ericsson, "PDCCH blind decoding—Outcome of offline discussions", R1-081101, Feb. 2008.

Motorola, "Search Space Definition for L1/L2 Control Channels", R1-073373, 3GPP TSG RAN1#50, Aug. 2007.

Motorola, "PDCCH Search Space Assignment Hashing Function", R1-081672, 3GPP TSG RAN1 #52bis, Mar. 2008.

Editor (Motorola), "Proposed: intra-CCE REG EPRE requirement", R1-081593, 3GPP TSG RAN WG1 Meeting #52bis, Mar. 2008.

Samsung, "UE-specific search space", R1-081212, 3GPP TSG RAN WG1 Meeting #52bis, Mar. 2008.

LG Electronics, "Randomization Function for PDCCH search space", R1-081567, 3GPP TSG RAN WG1#52bis, Mar. 2008.

In the USPTO U.S. Appl. No. 12/680,482, Non-Final Office Action dated Nov. 7, 2012, 17 pages.

* cited by examiner

FIG. 16

WIRELESS COMMUNICATION SYSTEM FOR MONITORING PHYSICAL DOWNLINK CONTROL CHANNEL

CROSS-REFERENCE TO RELATED APPLICATIONS

Pursuant to 35 U.S.C. §119(e), this application claims the benefit of U.S. Provisional Application No. 60/976,140, filed on Sep. 28, 2007, U.S. Provisional Application No. 61/023,440, filed on Jan. 25, 2008, U.S. Provisional Application No. 61/033,725, filed on Mar. 4, 2008, and U.S. Provisional Application No. 61/045,970, filed on Apr. 18, 2008, and pursuant to 35 U.S.C. 119(a), the application also claims the benefit of earlier filing date and right of priority to Korean Application No. 10-2008-0090742, filed on Sep. 16, 2008, the contents of which are all hereby incorporated by reference herein in their entirety.

FIELD OF THE INVENTION

The present invention relates to a wireless communication system and a method of monitoring a physical downlink control channel in the wireless communication system.

DESCRIPTION OF THE RELATED ART

In a wireless communication system, a base station (BS) provides services to a plurality of user equipments (UEs). The base station schedules user data for the plurality of user equipments and transmits control information containing scheduling information for the user data along with the user data. Generally, a channel that carries the control information is referred to as a control channel, and a channel that carries the user data is referred to as a data channel. A user equipment monitors the control channel to search for its control information and processes its data when the control information is successfully received.

In order to receive user data for the user equipment, first, the user equipment should receive the control information for the user data on the control channel. However, generally, control information of each of a plurality of user equipments is multiplexed into transmission interval in a given bandwidth and the base station transmits the multiplexed control information on the plurality of control channels in order to provide services to the plurality of user equipments. A user equipment searches for its control channel among the plurality of control channels.

One method for detecting specific control information among the multiplexed control information is blind decoding. In the blind decoding, the user equipment does not know whether the control information transmitted from the base station contains its control information. Therefore, the user equipment decodes all the multiplexed control information until its control information is found. In other words, since the user equipment does not know where its control information is located among a plurality of received control information, the user equipment decodes all the control information until its control information is found.

The user equipment may use a unique identifier to identify its control information. For example, when the base station multiplexes control information of a plurality of user equipments, the base station masks the unique identifier of each of the plurality of user equipments onto a cyclic redundancy check (CRC) of the control information and transmits the multiplexed control information. Then, the user equipment determines its control information by de-masking its unique identifier from the CRC of the received control information.

If the user equipment does not properly detect its control information from the multiplexed control information, it may not decode user data on a data channel. Therefore, prompt and correct detection of control information may improve performance of the system significantly. However, it may be difficult to detect the control information only by the simple blind decoding when different control information is necessary for different user equipments and control information of each user equipment has different code rate and modulation scheme. The size of the control information may also be different for each user equipment.

Accordingly, the number of decoding attempts in a control region on which the control information is transmitted may unexpectedly increase. As the number of decoding attempts in the blind decoding increases, battery consumption will also increase.

SUMMARY OF THE INVENTION

A method is sought for monitoring a control channel in order to reduce the number of decoding attempts in blind decoding. In one embodiment of the present invention, a method of monitoring a physical downlink control channel (PDCCH) in a wireless communication system includes monitoring a set of PDCCH candidates for a search space in a subframe, wherein the subframe includes a control region for transmitting control information, the control region including a plurality of resource elements mapped to a plurality of control channel elements (CCEs), a CCE corresponds to a set of resource elements, and the search space that includes a contiguous set of CCEs is classified into a common search space and a UE-specific search space, wherein the common search space is monitored by all user equipments (UEs) in a cell and the UE-specific search space is monitored by at least one UE in the cell.

In one aspect of the present invention, the subframe further includes a slot that includes a plurality of orthogonal frequency division multiplexing (OFDM) symbols in a time domain and a plurality of subcarriers in a frequency domain. A portion of the plurality of OFDM symbols and subcarriers in the slot makes up a resource block and the resource block includes resource elements in the portion. Locations for the PDCCH candidates for the search space occur every K CCEs where K is a size of a CCE aggregation level and a size of the search space is defined by the size of the CCE aggregation level and a number of the PDCCH candidates for the search space. A number of CCE aggregation levels for the common search space may be smaller than a number of CCE aggregation levels for the UE-specific search space.

In one aspect of the present invention, a starting location of the common search space may be same for all the UEs in the cell. The starting location of the common search space may be fixed or set to zero. A starting location of the UE-specific search space may be determined in every subframe.

In one aspect of the present invention, a starting location to search common control information is restricted in the common search space. A starting location to search first common control information and a starting location to search second common control information are restricted in the common search space. The starting location to search the first common control information may be different from the starting location to search the second common control information. The common search space and the UE-specific search space may overlap with each other.

In one embodiment of the present invention, a user equipment for monitoring a physical downlink control channel (PDCCH) includes a radio frequency (RF) unit for receiving a radio signal and a processor coupled with the RF unit and configured to monitor a common search space at each of common control channel element (CCE) aggregation levels in a subframe, wherein the subframe includes a control region for transmitting control information, the control region including a plurality of resource elements mapped to a plurality of CCEs, a CCE corresponds to a set of resource elements, and the common search space including a contiguous set of CCEs is monitored by all user equipments (UEs) in a cell, the processor further configured to monitor a UE-specific search space at each of UE-specific CCE aggregation levels in the subframe, wherein the UE-specific search space is monitored by at least one UE in the cell.

In one aspect of the present invention, in the user equipment, a starting location of the common search space may be same for all the UEs in the cell and a starting location of the UE-specific search space is UE-specific in the cell. In another aspect of the present invention, in the user equipment, a number of the common CCE aggregation levels may be smaller than a number of the UE-specific CCE aggregation levels.

In one embodiment of the present invention, a method of transmitting control information on a physical downlink control channel (PDCCH) in a wireless communication system includes configuring common control information on the PDCCH in a common search space, wherein the common search space is monitored by all UEs in a cell, and transmitting the common control information on the PDCCH. The method may further include transmitting UE-specific control information on the PDCCH in a UE-specific search space, wherein the UE-specific search space is monitored by at least one UE which receives the UE-specific control information.

BRIEF DESCRIPTION OF THE DRAWINGS

FIG. 16 shows PDCCH candidates according to CCE aggregation levels.

DETAILED DESCRIPTION OF THE PREFERRED EMBODIMENTS

Figure 1:
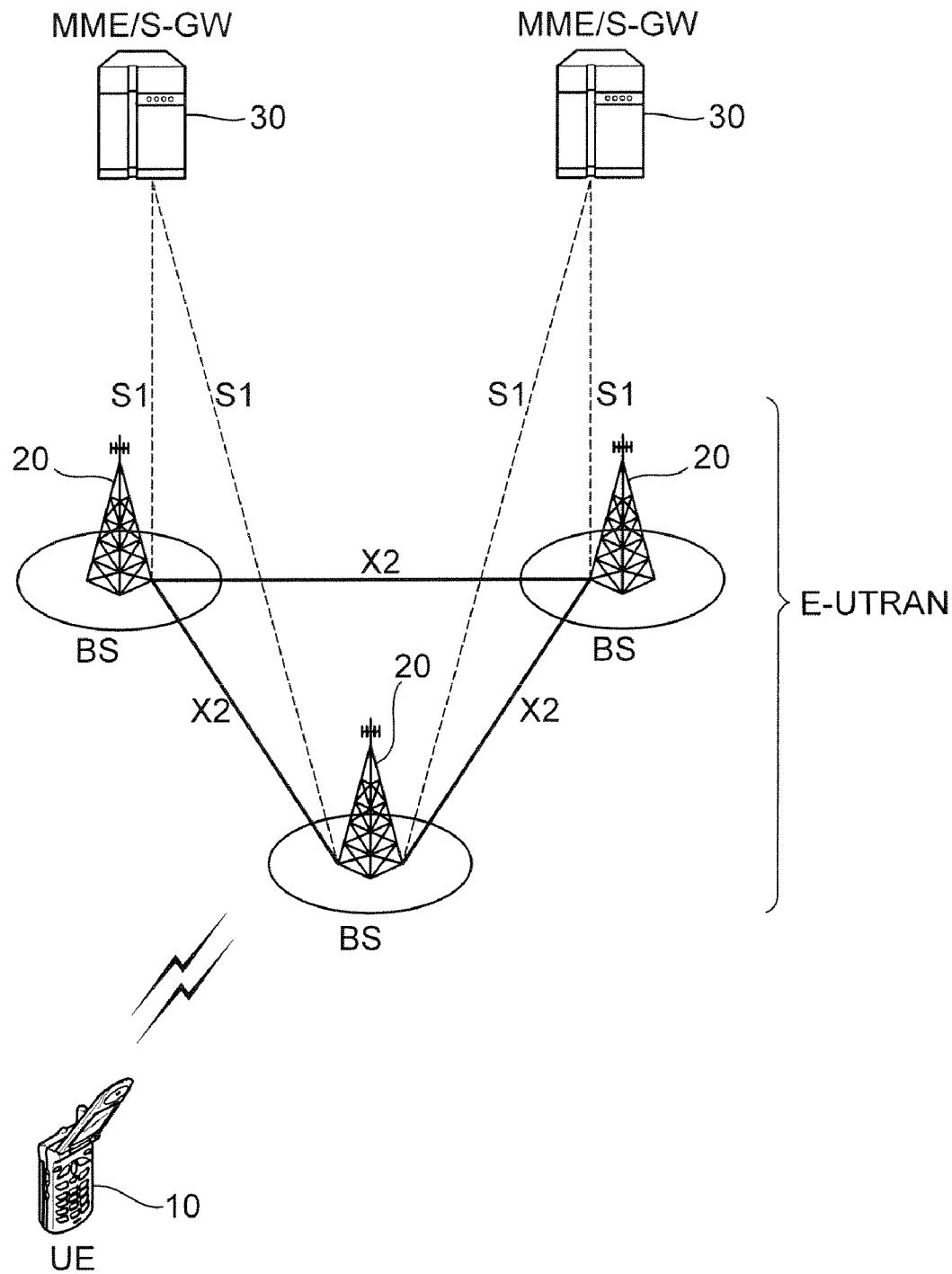
FIG. 1 is a block diagram showing a wireless communication system.

FIG. 1 is a block diagram showing a wireless communication system. The wireless communication system may be a network structure of an E-UMTS (Evolved-Universal Mobile telecommunications System) which is also referred to as an LTE (Long-Term Evolution) system. The wireless communication system may provide a wide variety of communication services including voices and packet data.

Referring to FIG. 1, an E-UTRAN (Evolved-UMTS Terrestrial Radio Access Network) includes at least one base station (BS) 20. A user equipment (UE) 10 can be fixed or mobile. The UE 10 may also be referred to as an MS (Mobile Station), a UT (User Terminal), a SS (Subscriber Station), or a wireless device. Generally, the BS 20 is a fixed station that communicates with the UE 10 and may also be referred to as an e-NB (evolved-NodeB), a BTS (Base Transceiver System), or an access point. There are one or more cells within the coverage of the BS 20. Interfaces for transmitting user traffic or control traffic may be used between BSs 20. Hereinafter, downlink means communication from the BS 20 to the UE 10, and uplink means a communication from the UE to the BS.

The BSs 20 are interconnected with each other by means of an X2 interface. The BSs 20 are also connected by means of the S1 interface to the EPC (Evolved Packet Core), more specifically, to the MME (Mobility Management Entity) by means of the S1-MME and to the Serving Gateway (S-GW) by means of the S1-U. The S1 interface supports a many-to-many relation between MME/S-GW 30 and the BS 20.

Figure 2:
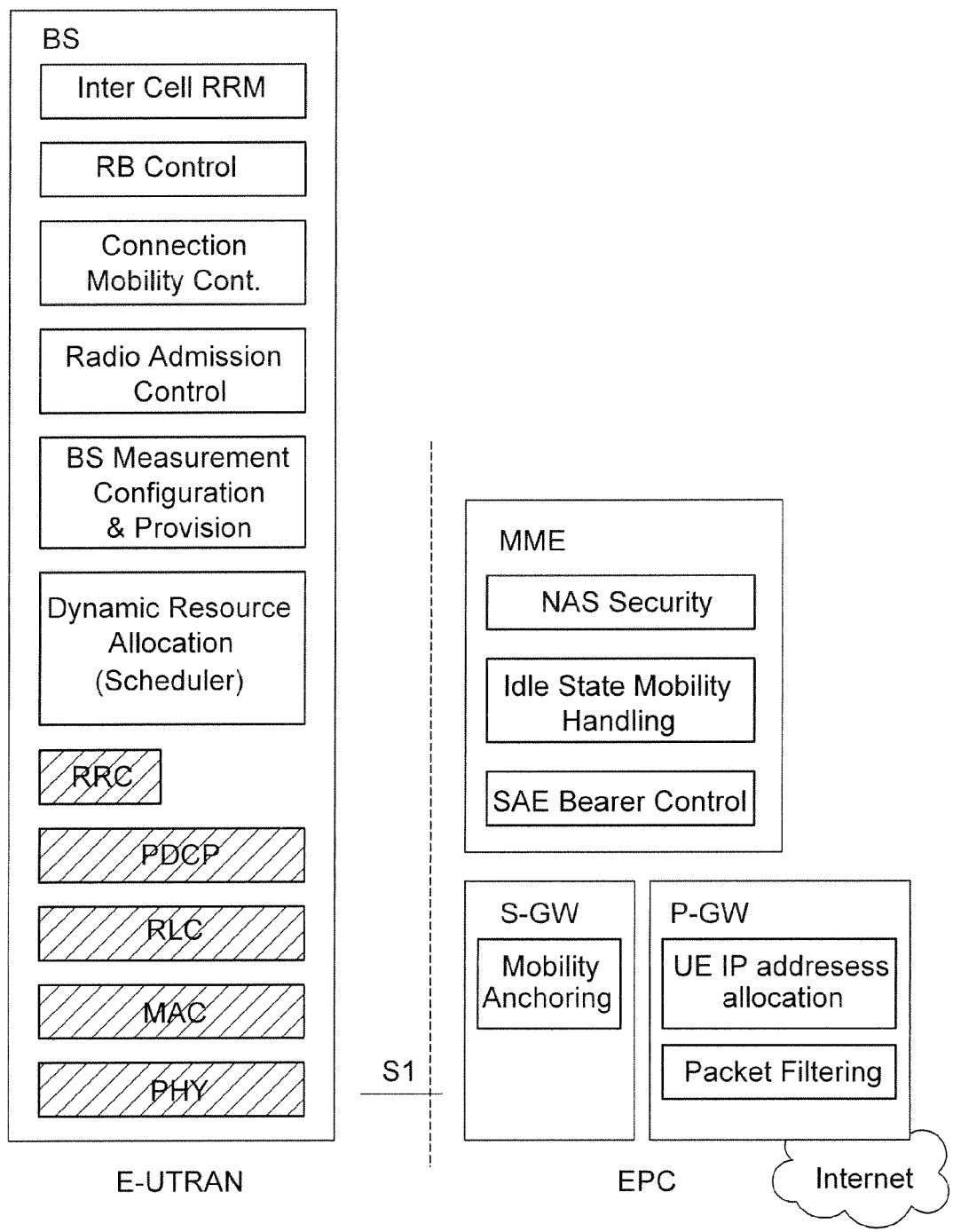
FIG. 2 is a block diagram showing functional separation between the E-UTRAN and the EPC.

FIG. 2 is a block diagram showing functional separation between the E-UTRAN and the EPC. Striped boxes depict radio protocol layers and white boxes depict the functional entities of the control plane.

Referring to FIG. 2, a BS 20 hosts the following functions: (1) Functions for Radio Resource Management such as Radio Bearer (RB) Control, Radio Admission Control, Connection Mobility Control, Dynamic Resource Allocation to UEs 10 in both uplink and downlink scheduling, (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling.

The MME hosts the following functions: (1) NAS (Non-Access Stratum) signaling, (2) NAS signaling security, (3) Idle mode UE Reachability, (4) Tracking Area list management, (5) Roaming and (6) Authentication.

The S-GW hosts (1) Mobility anchoring and (2) lawful interception. The PDN gateway (P-GW) hosts (1) UE IP (internet protocol) allocation and (2) packet filtering.

Figure 3:
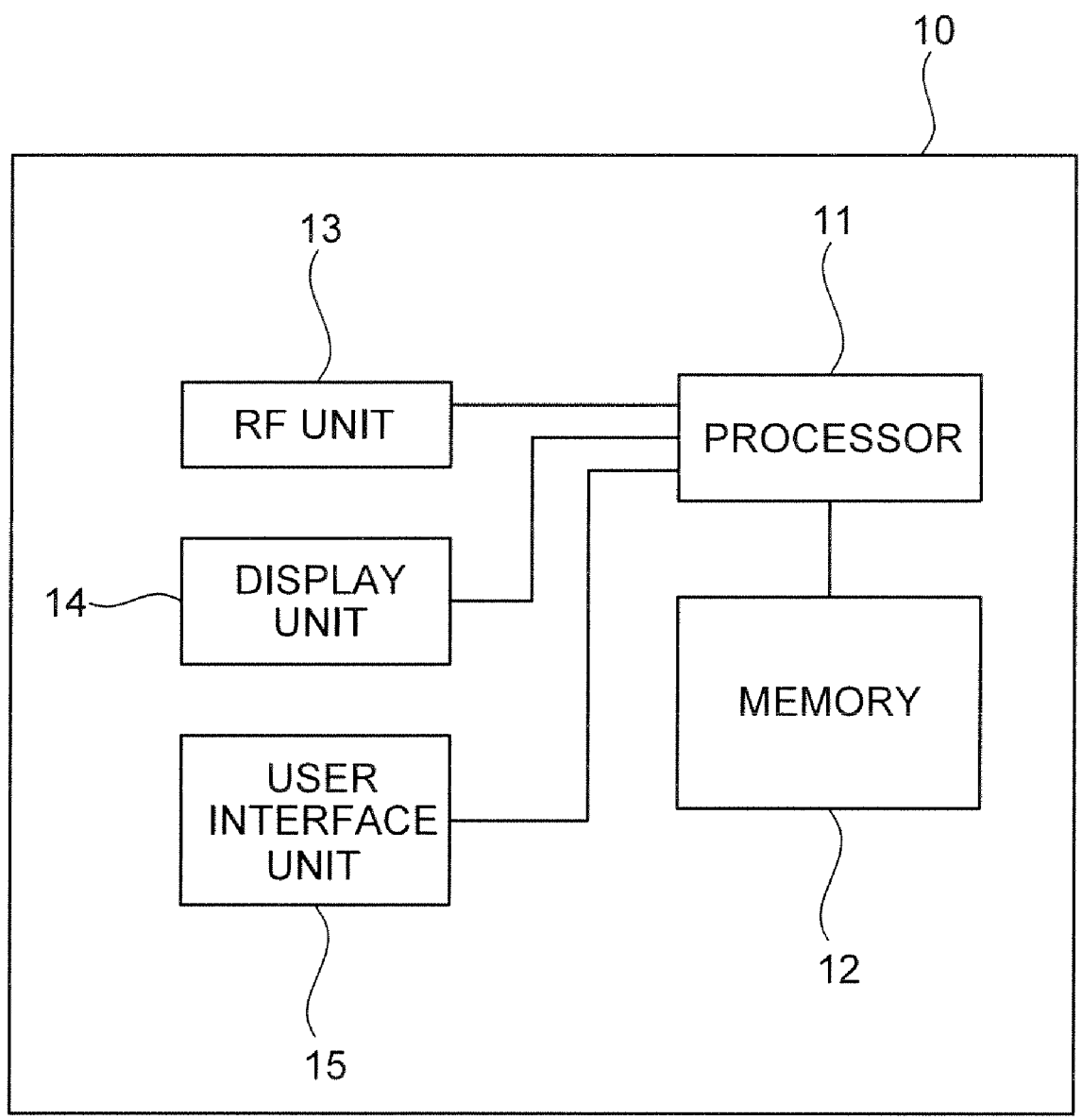
FIG. 3 is a block diagram showing individual elements of a UE.

FIG. 3 is a block diagram showing individual elements making up the UE 10. The UE 10 includes a processor 11, memory 12, an RF unit 13, a display unit 14 and a user interface unit 15. Layers of the radio interface protocol are implemented in the processor 11. The processor 11 provides a control plane and a user plane. The function of each layer can be implemented in the processor 11. The memory 12 is coupled to the processor 11 and stores an operating system, applications, and general files. The display unit 14 displays a variety of information of the UE 10 and may use a well-known element, such as an LCD (Liquid Crystal Display) or OLED (Organic Light Emitting Diode). The user interface unit 15 may be configured with a combination of well-known user interfaces such as a keypad and a touch screen. The RF unit 13 is coupled to the processor 11 and transmits and/or receives radio signals.

Layers of the radio interface protocol between the UE 10 and the BS 20 can be classified into L1 layer (a first layer), L2 layer (a second layer), and L3 layer (a third layer) based on the lower three layers of the Open System Interconnection (OSI) model. A physical (PFIY) layer belonging to the first layer provides information transfer service on a physical channel. A radio resource control (RRC) layer belonging to the third layer serves to control radio resources between the UE 10 and the network. The UE 10 and the network exchange RRC messages via the RRC layer.

Figure 4:
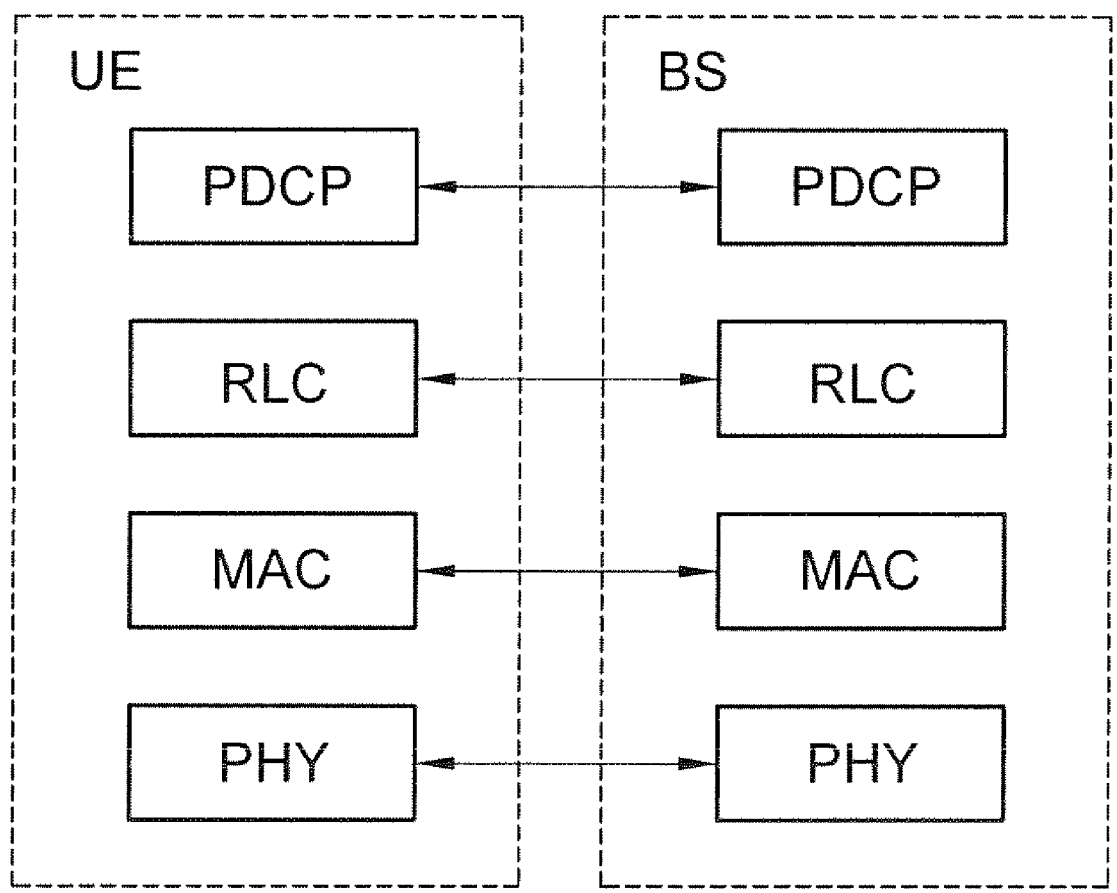
FIG. 4 is a block diagram showing radio protocol architecture for a user plane.
Figure 5:
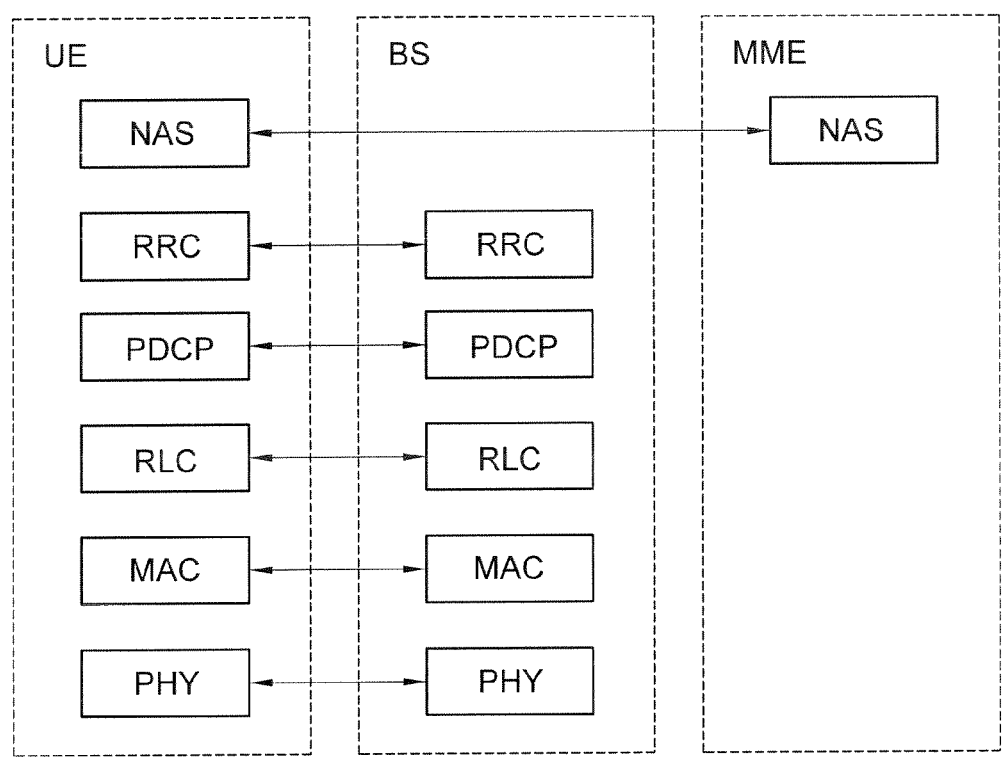
FIG. 5 is a block diagram showing radio protocol architecture for a control plane.

FIG. 4 is a block diagram showing radio protocol architecture for a user plane. FIG. 5 is a block diagram showing radio protocol architecture for a control plane. They illustrate the architecture of a radio interface protocol between the UE 10 and the E-UTRAN. The user plane is a protocol stack for user data transmission and the control plane is a protocol stack for control signal transmission.

Referring to FIGS. 4 and 5, a physical (PHY) layer belonging to the first layer offers information transfer services to upper layers on a physical channel. The PHY layer is coupled with a MAC (Medium Access Control) layer, i.e., an upper layer of the PHY layer, through a transport channel. Data is transferred between the MAC layer and the PHY layer through the transport channel. Between different physical layers, i.e., the physical layer of a transmitter and the physical layer of a receiver, data are transferred through the physical channel.

The MAC layer in the second layer provides services to an RLC (Radio Link Control) layer, i.e., an upper layer of the MAC layer, through a logical channel. The RLC layer in the second layer supports reliable data transfer. There are three operating modes, including TM (Transparent Mode), UM (Unacknowledged Mode) and AM (Acknowledged Mode), in the RLC layer according to a data transfer method, For example, the AM RLC provides bidirectional data transmission service and supports re-transmission when the transfer of an RLC PDU (Protocol Data Unit) fails.

A PDCP (Packet Data Convergence Protocol) belonging to the second layer performs header compression function. The PDCP layer reduces the header size of the Internet Protocol (IP) packet in order to transmit the IP packet efficiently.

A RRC (Radio Resource Control) layer belonging to the third layer is defined only in the control plane. The RRC layer serves to control the logical channel, the transport channel, and the physical channel in association with configuration, reconfiguration and release of radio bearers (RBs). The RB is a service provided by the second layer for data transmission between the UE 10 and the network. When an RRC connection is established between the RRC layer of the UE 10 and the RRC layer of the network, the UE is in the RRC connected mode. When an RRC connection is not established yet, the UE 10 is in the RRC idle mode. A NAS (Non-Access Stratum) layer belonging to the upper layer of the RRC layer serves to perform session management and mobility management.

Figure 6:
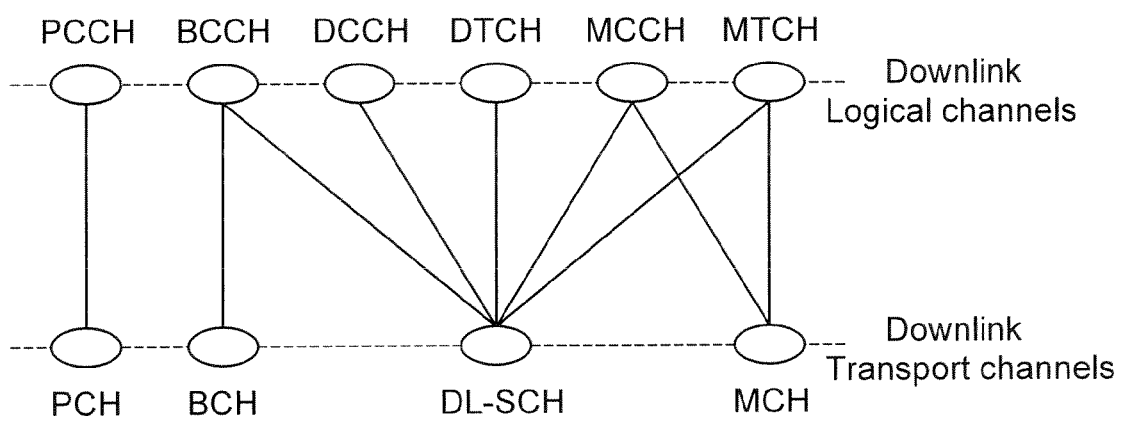
FIG. 6 shows mapping between downlink logical channels and downlink transport channels.

FIG. 6 shows mapping between downlink logical channels and downlink transport channels. Referring to FIG. 6, a paging control channel (PCCH) can be mapped to a paging channel (PCH). A broadcast control channel (BCCH) can be mapped to a broadcast channel (BCH) or a downlink shared channel (DL-SCH). A common control channel (CCCH), a dedicated control channel (DCCH), a dedicated traffic channel (DTCH), a multicast control channel (MCCH) and a multicast traffic channel (MTCH) can be mapped to the DL-SCH. The MCCH and MTCH can also be mapped to a multicast channel (MCH).

Each logical channel type is defined by what type of information is transferred. The logical channels are classified into two groups, control channels and traffic channels.

The control channels are used for transfer of control plane information. The BCCH is a downlink control channel for broadcasting system control information. The PCCH is a downlink channel that transfers paging information and used when the network does not know the location of a cell in which the UE 10 is located. The CCCH is a channel for transmitting control information between UEs 10 and network and used for UEs having no RRC connection with the network. The MCCH is a point-to-multipoint downlink channel used for transmitting multimedia broadcast multicast service (MBMS) control information from the network to the UE 10 for one or several MTCHs, and used only by UEs that receive the MBMS. The DCCH is a point-to-point bidirectional channel that transmits dedicated control information between the UE 10 and the network and used by UEs having an RRC connection.

Traffic channels are used for transfer of user plane information. The DTCH is a point-to-point channel dedicated to one UE 10 for transfer of user information. The DTCH may exist in both uplink and downlink. The MTCH is a point-to-multipoint downlink channel for transmitting traffic data from the network to the UE 10 and used only by UEs that receive the MBMS.

The transport channels are classified by how and what kinds of data are transferred over the radio interface. The BCH is broadcasted in the entire coverage area of the cell and has a fixed, pre-defined transport format. The DL-SCH is characterized by support for hybrid automatic repeat request (HARQ), support for dynamic link adaptation by varying the modulation, coding and transmit power, capability to broadcast in the entire cell, capability to use beamforming, support for both dynamic and semi-static resource allocation, support for UE discontinuous reception (DRX) to enable UE power saving and support for MBMS transmission. The PCH is characterized by support for UE discontinuous reception (DRX) enabling UE power saving and requirement for broadcast in the entire coverage area of the cell. The MCH is characterized by requirement for broadcast in the entire coverage area of the cell and support for MBMS Single Frequency Network (MBSFN) combining MBMS transmission on multiple cells.

Figure 7:
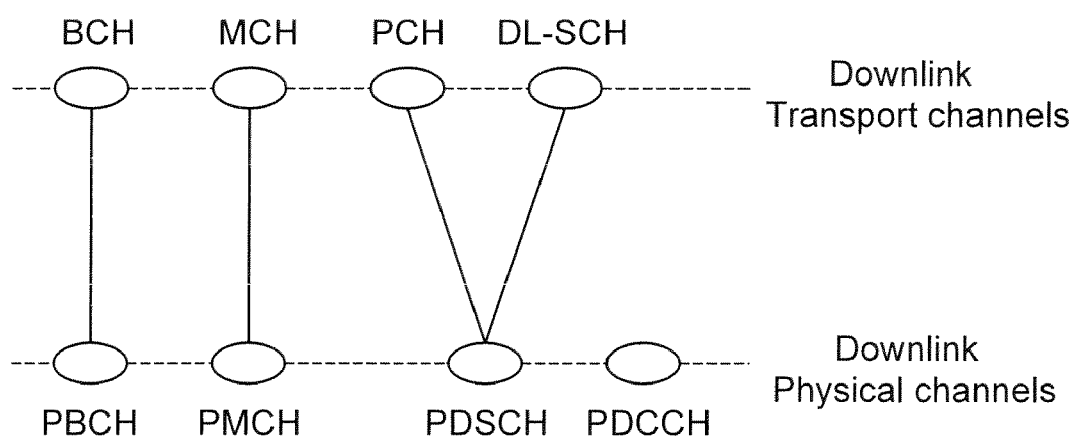
FIG. 7 shows mapping between downlink transport channels and downlink physical channels.

FIG. 7 shows mapping between downlink transport channels and downlink physical channels. Referring to FIG. 7, a BCH can be mapped to a physical broadcast channel (PBCH). A MCH can be mapped to a physical multicast channel (PMCH). A PCH and a DL-SCH can be mapped to a physical downlink shared channel (PDSCH). The PBCH carries the BCH transport block. The PMCH carries the MCH. The PDSCH carries the DL-SCH and PCH.

There are several downlink physical control channels used in the physical layer. A physical downlink control channel (PDCCH) may carry resource allocation and transport format of DL-SCH, paging information on PCH, system information on DL-SCH, resource allocation of control messages of the upper layer such as random access response transmitted on PDSCH, HARQ information, resource allocation of PDSCH, transmit power control commands, activation for VoIP, and information on update of system information. Further, the PDCCH may carry the uplink scheduling grant which informs the UE 10 about resource allocation of uplink transmission. A physical control format indicator channel (PCFICH) informs the UE 10 about the number of OFDM symbols used for the PDCCHs and is transmitted in every subframe. A physical Hybrid ARQ Indicator Channel (PHICH) carries HARQ ACK/NAK signals in response to uplink transmissions.

Figure 8:
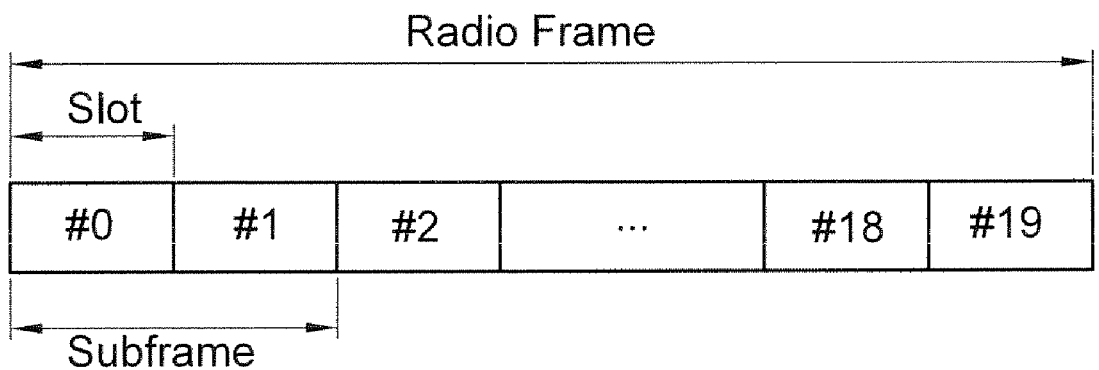
FIG. 8 shows the structure of a radio frame.

Referring to FIG. 8, showing the structure of a radio frame, the radio frame is composed of 10 subframes, and each subframe includes two slots. Time taken to transmit a subframe is referred to as a Transmission Time Interval (TTI). For example, the length of a subframe may be 1 mili-second (ms), and the length of a slot may be 0.5 ms. The structure of the radio subframe shown in FIG. 8 is merely an example, and the number of subframes included in the radio frame, the number of slots included in the subframe, and the number of OFDM symbols included in the slot may be modified in various ways.

Figure 9:
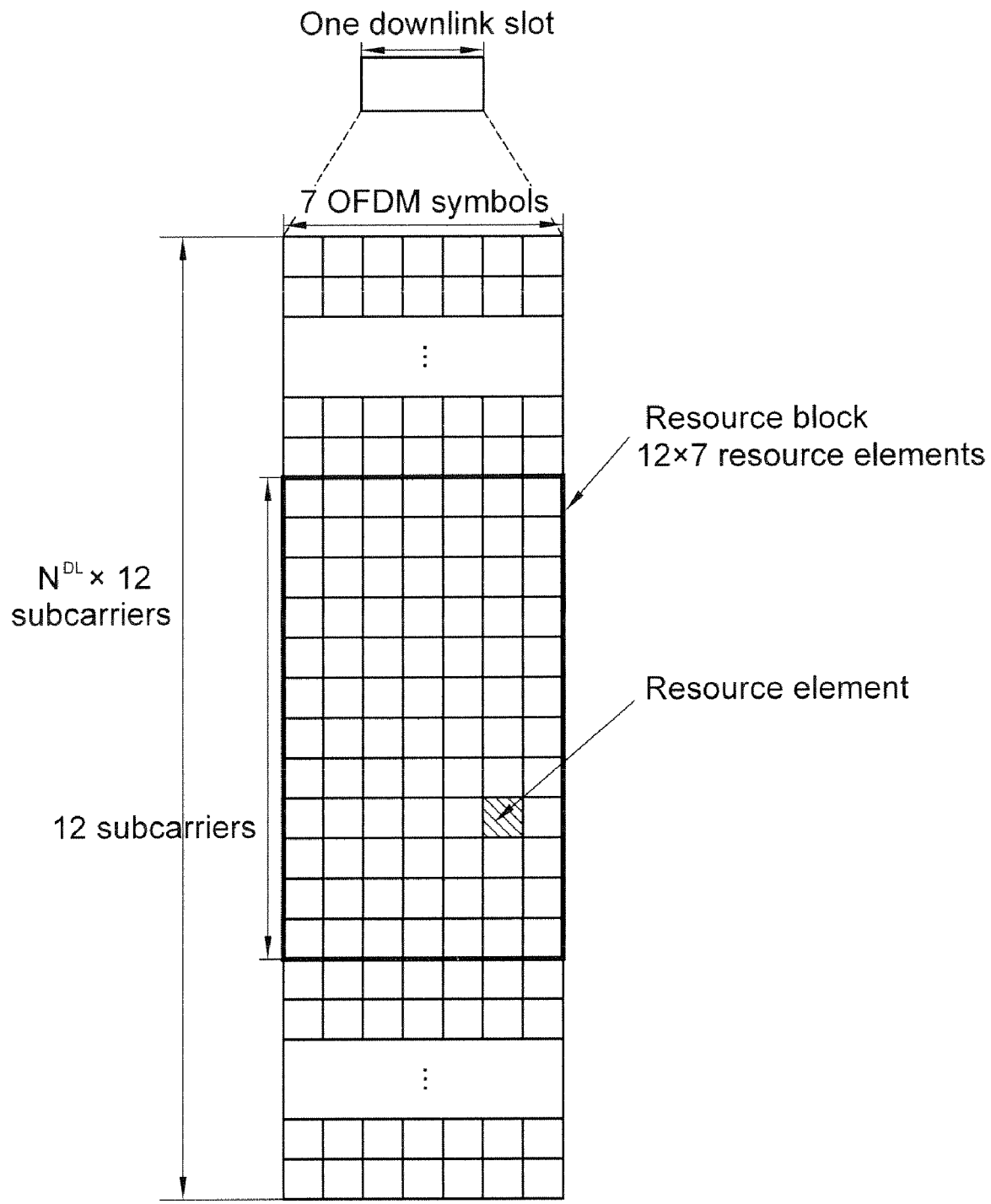
FIG. 9 shows a resource grid for one downlink slot.

Referring to FIG. 9, showing a resource grid for one downlink slot, the downlink slot includes a plurality of Orthogonal Frequency Division Multiplexing (OFDM) symbols in a time domain. Although FIG. 9 shows that a downlink slot includes 7 OFDM symbols and a resource block includes 12 subcarriers in a frequency domain, this configuration is merely exemplary and the downlink slot is not limited to such configuration.

Each element on the resource grid is referred to as a resource element, and a resource block includes 12×7 resource elements. The number of resource blocks included in a downlink slot $N^{DL}$ subordinates to a downlink transmission bandwidth set in a cell.

Figure 10:
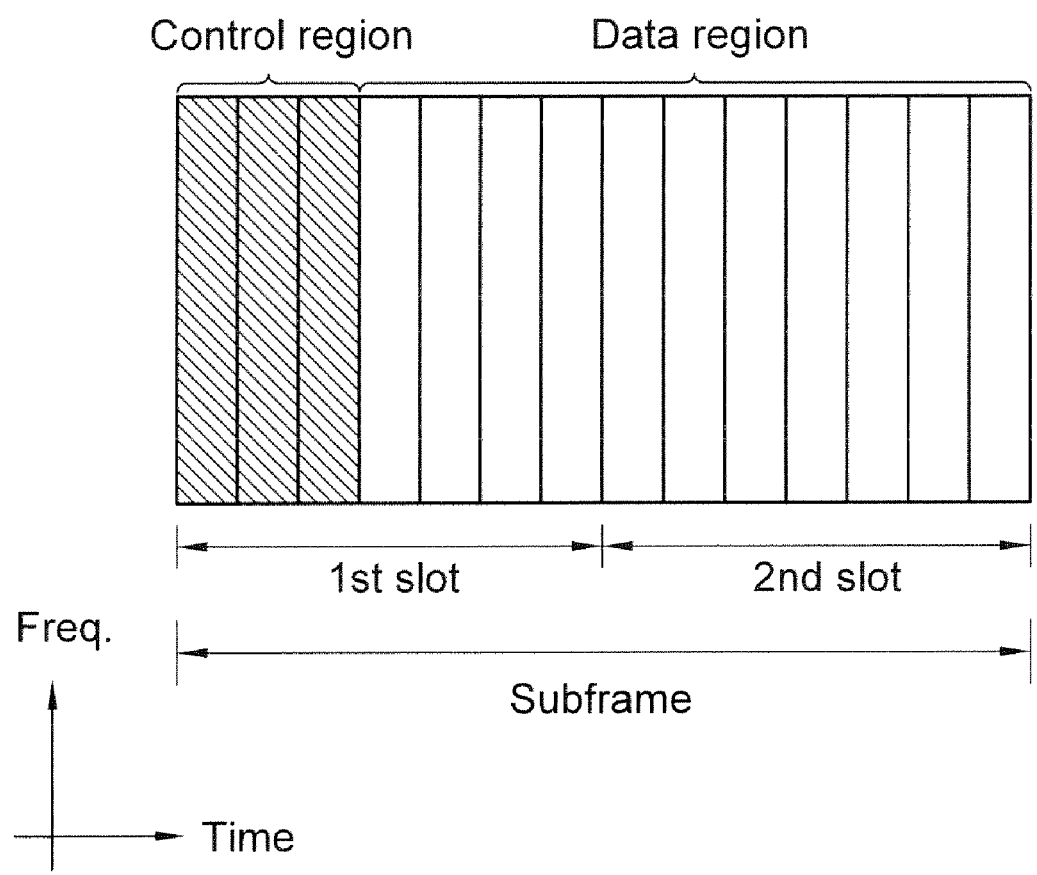
FIG. 10 shows the structure of a subframe.

Referring to FIG. 10, showing the structure of a subframe, one subframe includes two consecutive slots. First three OFDM symbols of the first slot in the subframe correspond to a control region on which PDCCHs are allocated, and the rest of the OFDM symbols in the subframe correspond to a data region on which a PDSCH is allocated. A PCFICH in the first OFDM symbol of the subframe carries information on the number of OFDM symbols used for the control region.

A PDCCH may carry resource allocation and transport format of DL-SCH, paging information on PCH, system information on DL-SCH, resource allocation of control messages of the upper layer such as random access response transmitted on PDSCH, Transmit Power Control (TPC) commands for each UE, and activation for VoIP. A plurality of PDCCHs may be transmitted within the control region, and a UE 10 monitors the plurality of PDCCH. The PDCCH is transmitted on an aggregation of one or several consecutive control channel elements (CCEs) which are used to provide the PDCCH with a code rate corresponding to radio channel's condition. A CCE corresponds to a set of resource element groups. Resource element groups are used for defining the mapping of control channels to resource elements. The format of the PDCCH and the number of available bits of the PDCCH are determined according to association of the number of CCEs and the code rate provided by the CCEs. The example of the format of the PDCCH depending on the number of CCEs is shown in table 1.

TABLE 1

| PDCCH Format | Number of CCEs |
|---|---|
| 0 | 1 |
| 1 | 2 |
| 2 | 4 |
| 3 | 8 |

A CCE unit is the aggregation of at least one CCE. For example, the CCE unit 1 is composed of one CCE, the CCE unit 2 is composed of two consecutive CCEs, the CCE unit 3 is composed of three consecutive CCEs and the CCE unit 4 is composed of four consecutive CCEs. A CCE aggregation level of L∈{1,2,4,8} indicates the number of CCEs in a CCE unit.

Control information transmitted through the PDCCH is referred to as Downlink Control Information (DCI). The DCI transmits uplink or downlink scheduling information or an uplink TPC command. The DCI format is classified into format 0 for transmission of uplink shared channel (UL-SCH) allocation, format 1 for transmission of DL-SCH allocation for a Single Input Multiple Output (SIMO) operation, format 1A for compact transmission of DL-SCH allocation for a SIMO operation or for transmission control information for system information on PDSCH and random access response, format 1B for transmission of Multiple Input Multiple Output (MIMO) rank 1 based on compact resource assignment, format 1C for transmission control information for system information on PDSCH and random access response, format 2 for transmission of DL-SCH allocation for a MIMO operation, and format 3 and format 3A for transmission of TPC commands for an uplink channel.

Figure 11:
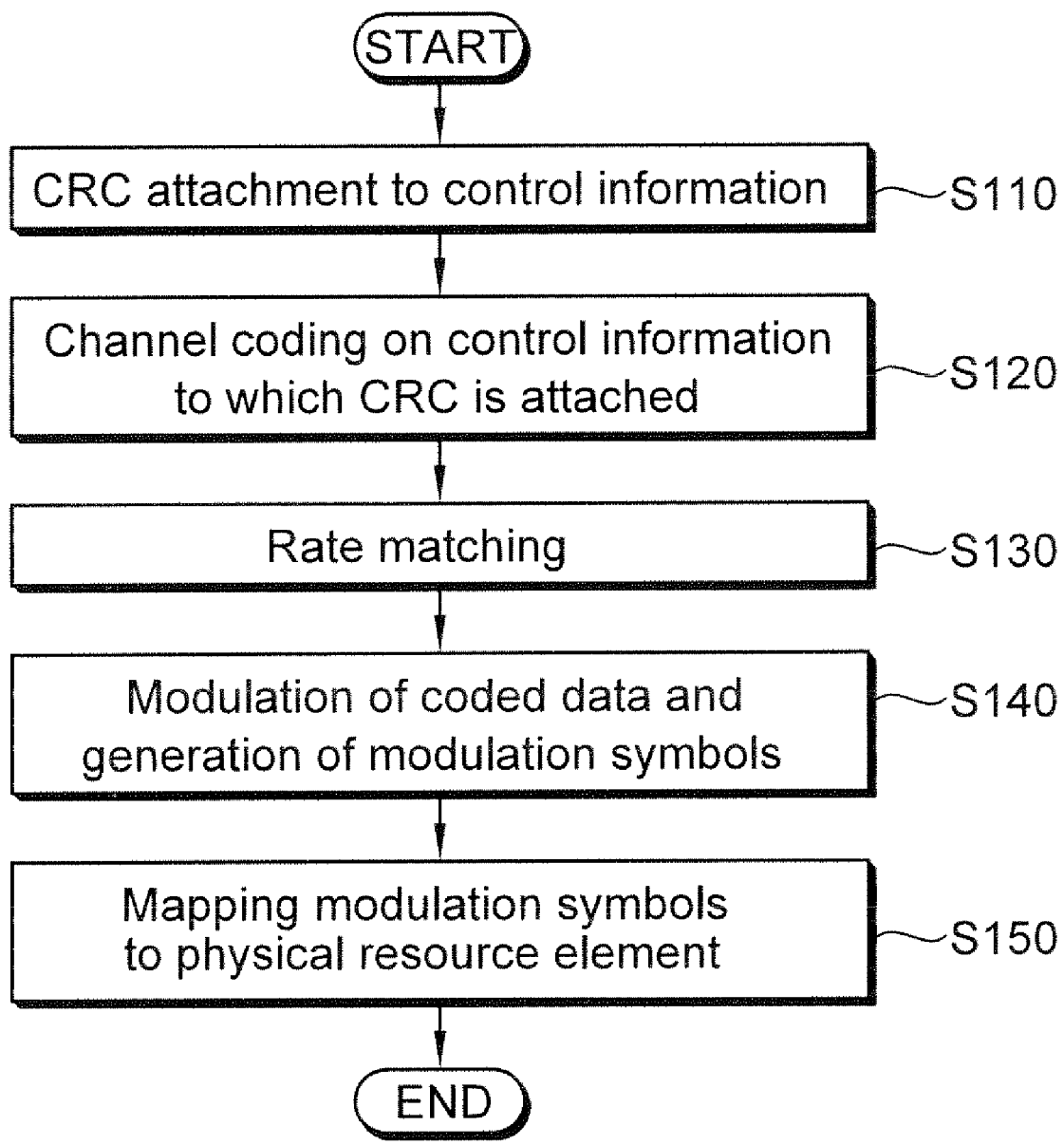
FIG. 11 is a flowchart illustrating constructing a PDCCH.

Referring to FIG. 11, illustrating constructing a PDCCH, in S110, a BS 20 determines a PDCCH format to be transmitted to the UE 10 based on the DCI and attaches a Cyclic Redundancy Check (CRC) to control information. An identifier, which is referred to as a Radio Network Temporary Identifier (RNTI), is masked on the CRC according to the owner or usage of a PDCCH. If the PDCCH is for a specific UE 10, a unique identifier of the UE, for example, a Cell-RNTI (C-RNTI), may be masked on the CRC. Or, if the PDCCH is for paging information, a paging indication identifier, for example, Paging-RNTI (P-RNTI), may be masked on the CRC. If the PDCCH is for system information, a system information identifier, for example, a system information-RNTI (SI-RNTI), may be masked on the CRC. The SI-RNTI may be differentiated according to the type of system information. A Random Access-RNTI (RA-RNTI) may be masked on the CRC in order to indicate a random access response, which is a response to transmission of a random access preamble of a UE 10. The RA-RNTI may be differentiated according to the subframe in which the random access preamble is transmitted. A Transmit Power Control-RNTI (TPC-RNTI) may be masked on the CRC in order to indicate uplink TPC commands for a specific UE group. Table 2 shows examples of identifiers masked on a PDCCH.

TABLE 2

| Type | Identifier | Description |
|---|---|---|
| UE-specific | C-RNTI | Used for the UE corresponding to the C-RNTI |
| Common | P-RNTI | Used for paging message |
|  | SI-RNTI | Used for system information (may be differentiated according to the type of system information.) |

TABLE 2-continued

| Type | Identifier | Description |
|---|---|---|
| | RA-RNTI | Used for random access response (may be differentiated according to subframe or PRACH slot index for UE PRACH transmission.) |
| | TPC-RNTI | Used for uplink transmit power control command. (may be differentiated according to the index of UE TPC group.) |

If the C-RNTI is used, the PDCCH carries control information for a specific UE 10, and if other RNTIs are used, the PDCCH carries common control information received by all or a plurality of UEs within a cell.

In S120, coded data is generated by performing channel coding on the control information to which the CRC is attached. In S130, rate matching is performed based on the number of CCEs assigned to the PDCCH format. In S140, modulation symbols are created by modulating the coded data. In S150, the modulation symbols are mapped to physical resource elements.

Figure 12:
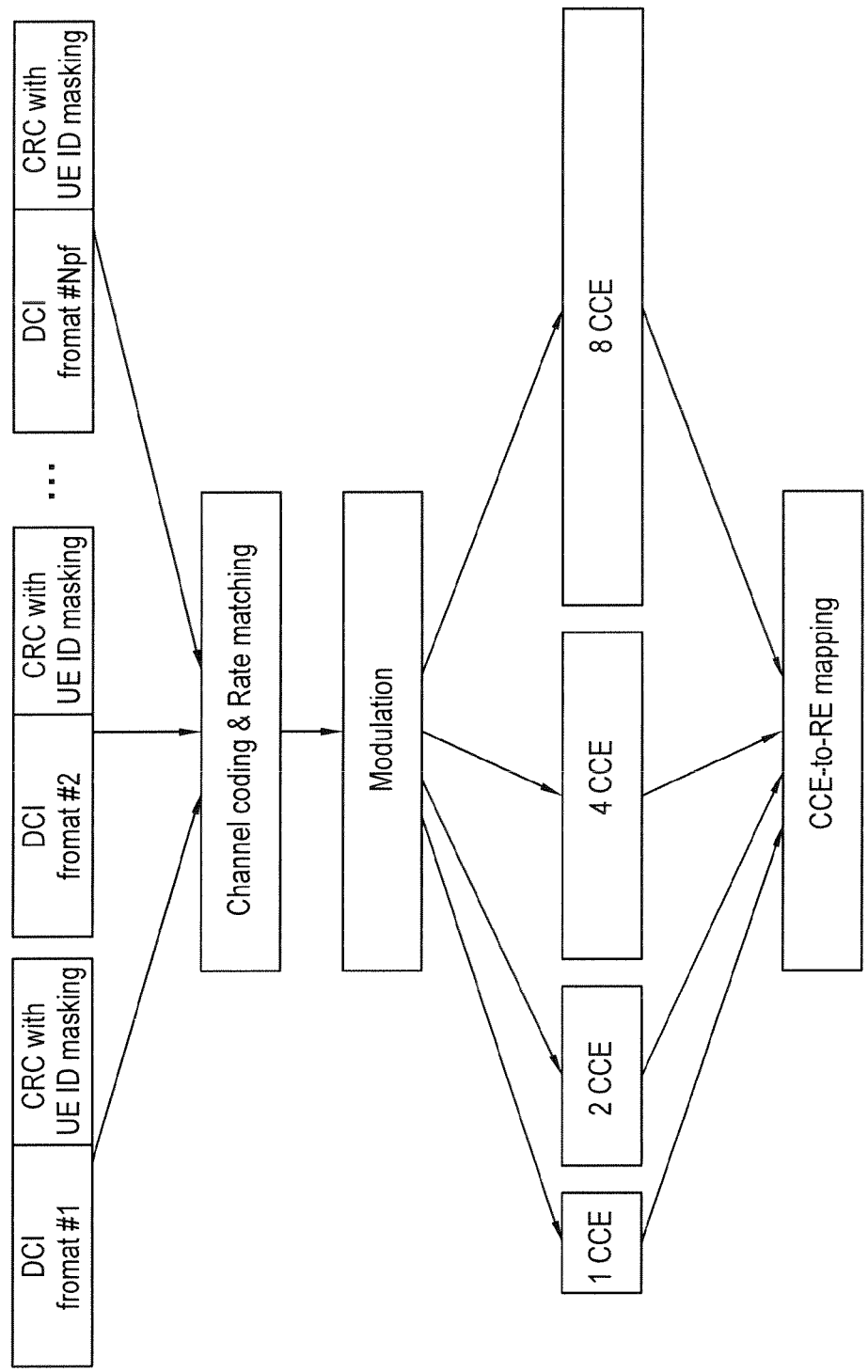
FIG. 12 shows decoding of PDCCHs.

Referring to FIG. 12, showing decoding of PDCCHs, a CRC masked with UE ID i.e., C-RNTI, is attached to a DCI. Then, channel coding, rate matching and modulation are sequentially performed. Modulated DCIs are mapped to at least one CCE according to PDCCH format, for example, 1 CCE, 2 CCEs, 4 CCEs and 8 CCEs. Finally, the CCEs are mapped to physical resource elements (REs).

A plurality of PDCCHs may be transmitted in a single subframe. The UE 10 monitors the plurality of PDCCHs in every subframe. Here, monitoring means that the UE 10 attempts decoding control information on each of the plurality of PDCCHs based on the monitored PDCCH format. In the control region allocated in the subframe, the BS 20 does not provide the UE 10 with information on the location of a corresponding PDCCH. The UE 10 finds its PDCCH by monitoring a set of PDCCH candidates in every subframe. This is referred to as blind decoding. For example, if no CRC error is detected when the UE 10 de-masks its C-RNTI on a PDCCH, the UE determines that the PDCCH carries its own control information.

Figure 13:
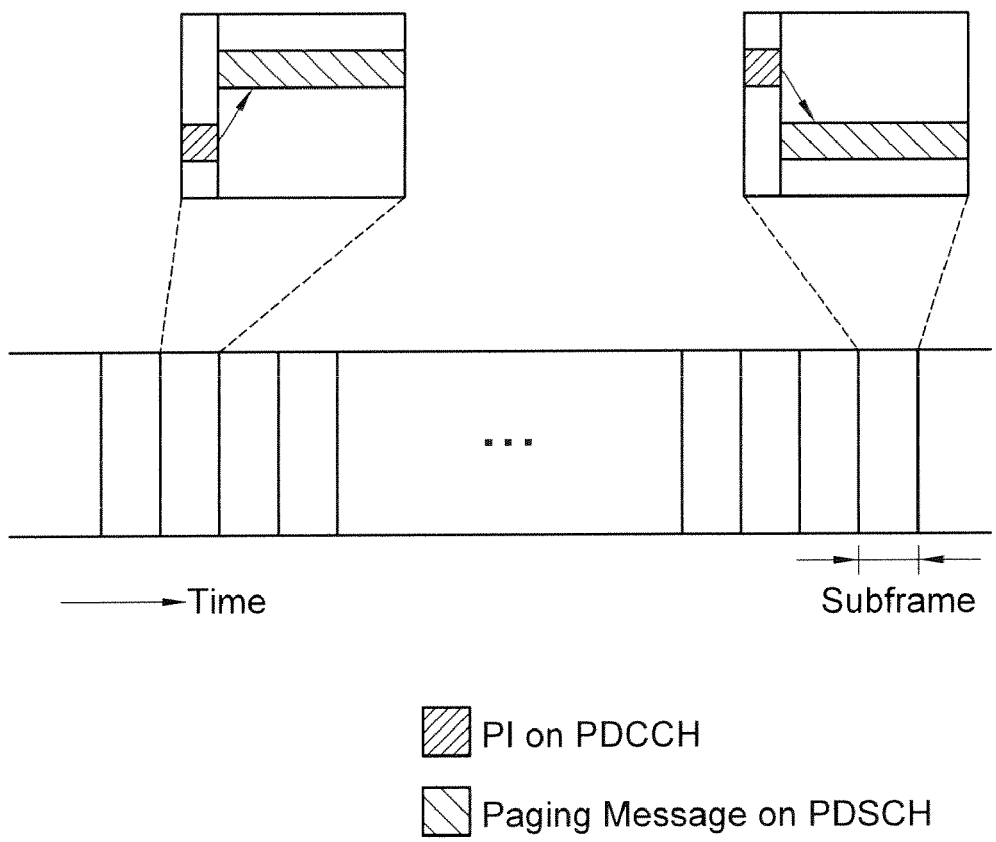
FIG. 13 illustrates monitoring a control channel according to blind decoding in active mode.

FIG. 13 illustrates monitoring a control channel according to blind decoding in active mode. Referring to FIG. 13, in the active mode, a UE 10 monitors PDCCH candidates in every subframe in order to receive data transmitted to the UE. For clarity, paging information (PI) is considered as the control information.

For each subframe, a UE 10 in a cell searches for PI from a plurality of PDCCH candidates through blind decoding. The UE 10 de-masks P-RNTI on each CRC of the plurality of PDCCH candidates. If no CRC error is detected, the UE 10 reads the PI from a PDCCH. The UE 10 receives a paging message on the PDSCH corresponding to the PDCCH.

Figure 14:
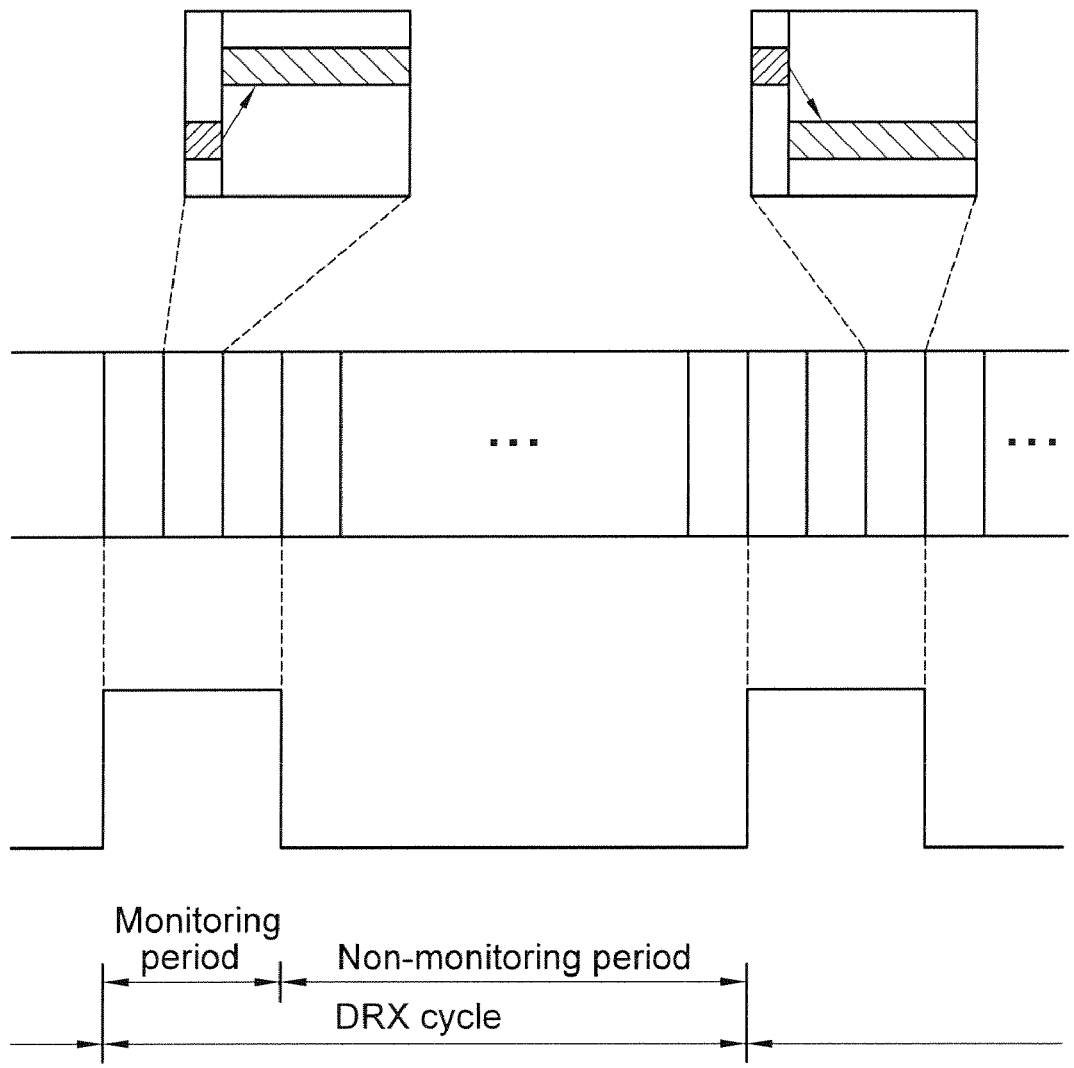
FIG. 14 illustrates monitoring a control channel according to blind decoding in DRX mode.

FIG. 14 illustrates monitoring a control channel according to blind decoding in DRX (discontinuous reception) mode. Referring to FIG. 14, in the DRX mode, a UE 10 wakes up in the monitoring period of each DRX cycle and monitors PDCCHs in a subframe corresponding to the monitoring period. That is, in each subframe belonging to the monitoring period, the UE 10 searches for its PDCCH. During the non-monitoring period, the UE 10 enters into a sleep mode and stops monitoring PDCCHs to save the battery consumption.

As shown in FIGS. 13 and 14, the UE 10 should perform blind decoding for all CCEs in a subframe in order to receive a PDCCH transmitted to the UE. A subframe in which PDCCHs are monitored is referred to as a non-DRX subframe. Since the UE 10 does not know which PDCCH format is transmitted and when its PDCCH is transmitted, the UE should decode all PDCCHs by all possible CCE aggregation levels until blind decoding for a PDCCH succeeds within each non-DRX subframe. For example, since the UE 10 does not know how many CCEs are used in a PDCCH for the current PI, the UE should perform blind decoding for all possible CCE aggregation levels until the blind decoding for the PDCCH succeeds. That is, the UE 10 first decodes all the PDCCHs by the CCE aggregation level of L=1. If the decoding fails, decoding is tried by the CCE aggregation level of L=2. Then, if the decoding by the CCE aggregation level of L=2 fails, decoding is tried by the CCE aggregation levels of L=4 and L=8 until the decoding succeeds.

If the UE 10 attempts blind decoding by all CCE aggregation levels for all possible RNTIs, the number of decoding attempts is excessively large, and thus, battery consumption of the UE may be high due to monitoring of the PDCCHs. For example, when total number of CCEs is 32 in a non-DRX subframe and the number of CCE aggregation levels is four of {1, 2, 4 and 8}, if blind decoding is tried for all four RNTIs, including C-RNTI, P-RNTI, SI-RNTI, and RA-RNTI, the UE 10 tries the maximum of 240(=4×(32+16+8+4)) blind decodings. Therefore, a method of efficiently monitoring PDCCHs while reducing battery consumption is desired.

Figure 15:
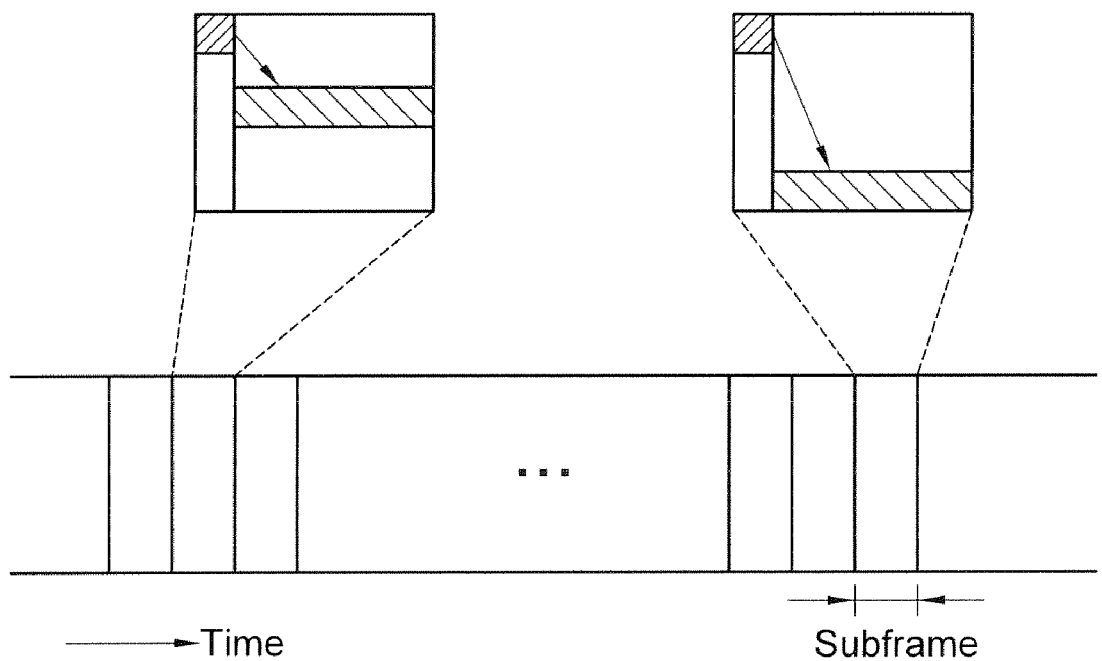
FIG. 15 illustrates monitoring a control channel according to an embodiment of the present invention.

FIG. 15 illustrates monitoring a control channel according to an embodiment of the present invention. Referring to FIG. 15, a region to which a PDCCH carries PI is same in every subframe. The location of a logical or physical resource region allocated for the PDCCH that carries specific control information, such as PI, is fixed in every subframe. The UE 10 monitors the PDCCH in the fixed logical/physical resource region.

In order to reduce burdens of the UE 10 imposed by the blind decoding, a PDCCH for specific control information is not randomly allocated in a CCE set of a subframe, but is allocated based on a fixed location, fixed starting location, and/or fixed number of CCEs based on the fixed starting location. Here, the fixed location is a location known to both the BS 20 and the UE 10 and is not necessarily limited to a physically/logically fixed location. The CCE set is a set of total CCEs allocated in the subframe. Here, although it is shown that a PDCCH for PI is fixedly allocated to the starting location in the CCE set, the PDCCH may be fixed to another random starting location in the CCE set.

A different number of CCE units may be assigned according to DCI. This means that the number of CCE aggregation levels for a PDCCH carrying specific DCI may be restricted. For example, common control information uses two CCE aggregation levels, i.e., CCE aggregation levels 4 and 8, and UE-specific control information uses four CCE aggregation levels, i.e., CCE aggregation levels 1, 2, 4 and 8. If the number of CCE aggregation levels for the common control information is smaller than that for UE-specific control information, the number of detection attempts for PDCCH carrying the common control information may be reduced.

The UE 10 tries blind decoding for the first CCE in the CCE set of a subframe. If the blind decoding fails, the UE 10 tries blind decoding for two, four and eight CCEs in order while the starting location is fixed. If the four blind decodings fails, the UE 10 determines that there is no PI in the subframe. Accordingly, the number of decoding attempts for detecting PI may be reduced. If a fixed CCE unit, for example, only CCE aggregation level L=4, is used for PI, the UE 10 may confirm whether PI is received only by attempting one blind decoding for four CCEs.

Here, although it is described that only P-RNTI is monitored, the present invention may be applied to monitoring PDCCHs of other identifiers, such as SI-RNTI, RA-RNTI and TPC-RNTI.

For specific control information, a fixed CCE aggregation level based on a fixed starting location may be allocated in the CCE set of a subframe. For example, the DCI format 1C is used to transmit system information addressed by the SI-RNTI or a random access response addressed by the PA-RNTI. The random access response is used in various causes such as a random access for initial access, a random access for requesting the allocation of uplink radio resources, a random access for a handover, and a random access for aligning uplink timing. The DCI format 1C for the system information is restricted to start first CCE at the CCE aggregation level 8, and the DCI format 1C for the random access response is restricted to start eighth CCE at the CCE aggregation level 8 or fourth CCE at the CCE aggregation level 4. By allocating PDCCH based on a fixed starting location and a fixed CCE aggregation level, the number of decoding attempts can be reduced.

Although a plurality of PDCCHs are multiplexed in a subframe, the locations and number of CCEs are fixed according to control information carried by the plurality of PDCCHs within the candidate resource region in the CCE set which is a logical resource region. The candidate resource region is a region including a plurality of CCEs of the CCE set, and the location and size of the candidate resource region are known to both the UE 10 and the BS 20. The candidate resource region may also be referred to as a search space. The UE 10 tries blind decoding for a PDCCH related to specific control information in the candidate resource region.

Information on the candidate resource region may be known to both the UE 10 and the BS 20 without exchanging any signals, acquired from an equation by using a common parameter shared by the UE and the BS, or informed by the BS to the UE through RRC signaling, system information, or the like. The size and location of the candidate resource region may be fixed or variable.

A PDCCH mapped in the candidate resource region may be used for common control information such as paging information, system information and a set of TPC commands. The common control information is information that should be received by a plurality of UEs 10 in a cell. A region for monitoring a common PDCCH that carries the common control information is fixed in the candidate resource region of the CCE set, not in the entire CCE set, and a UE specific (UE-specific) PDCCH is allocated at a certain location on the CCE set. The UE 10 monitors the common PDCCH in the candidate resource region and a UE-specific PDCCH in the other region or overall CCE set, and thus, the number of decoding attempts is reduced, and battery consumption of the UE may be reduced.

The candidate resource region for searching the common PDCCH may overlap with the region for searching the UE-specific PDCCH. Alternatively, the candidate resource region for searching the common PDCCH may be separated from the region for searching the UE-specific PDCCH.

A PDDCH carrying a specific DCI may have a fixed candidate resource region on the CCE set. Also, the PDCCH carrying the specific DCI may have a fixed starting location at each CCE aggregation level in the candidate resource region. For example, the DCI format 1C for the system information is restricted to start first CCE at the CCE aggregation level 8, and the DCI format 1C for the random access response is restricted to start eighth CCE at the CCE aggregation level 8 or fourth CCE at the CCE aggregation level 4.

In order to reduce the number of decoding attempts, a space in which PDCCHs for some specific control information are searched is limited. The UE 10 monitors a set of PDCCH candidates in each subframe. The monitoring means attempting to decode each of the PDCCHs based on all monitored DCI formats and the PDCCH candidate is a PDCCH on which the UE 10 attempts decoding.

Hereinafter, a space for searching for a PDCCH is referred to as a search space. A set of PDCCH candidates is defined based on the search space. When a set of all CCEs for a PDCCH in one subframe is defined as a CCE set, a search space is a set of contiguous CCEs starting from a specific starting location with respect to a CCE aggregation level in the CCE set. A CCE aggregation level L is a CCE unit for searching for a PDCCH, the size of which is defined by the number of contiguous CCEs. The CCE aggregation level L also means the number of CCEs used to transmit a PDCCH. The search space is defined based on the CCE aggregation level. The locations of PDCCH candidates occur every L CCEs where L is the size of a CCE aggregation level.

Figure 16:
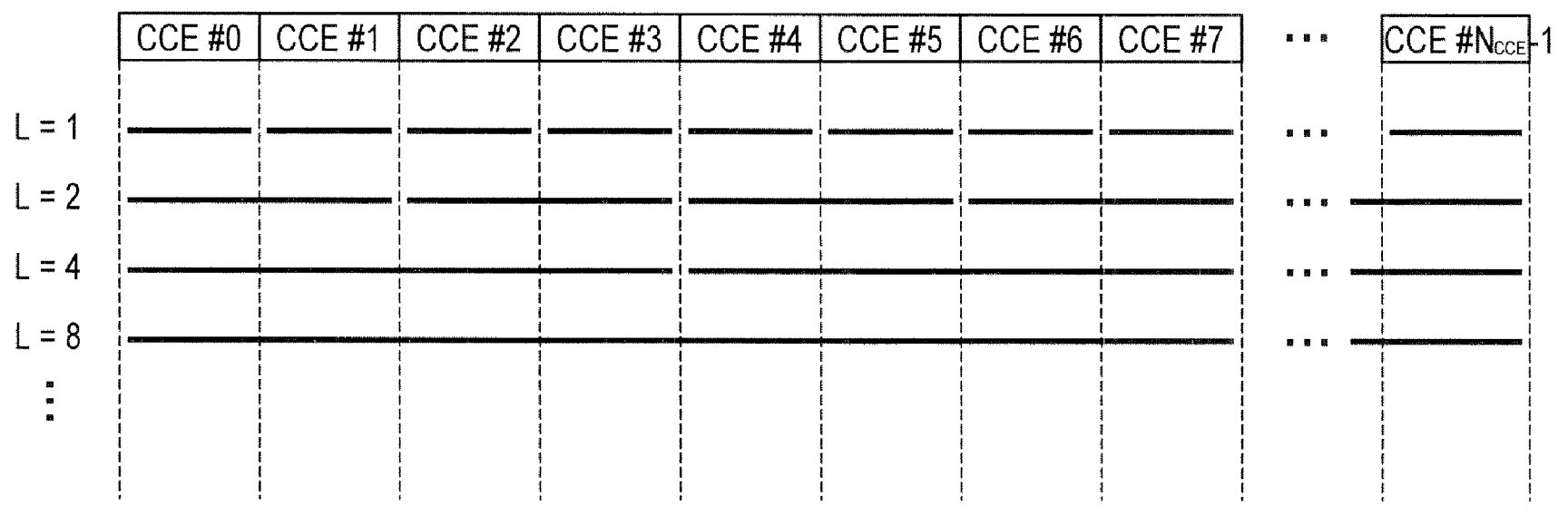

FIG. 16 shows PDCCH candidates according to CCE aggregation levels. $N_{CCE}$ denotes total number of CCEs in one subframe. Referring to FIG. 16, PDCCH candidates occur every L CCEs. PDCCH candidates at the CCE aggregation level 2 occur every 2 CCEs. PDCCH candidates at the CCE aggregation level 4 occur every 4 CCEs.

The search space is classified into a common search space and a UE-specific search space. The common search space is monitored by all UEs 10 in a cell, and the UE-specific search space is monitored by at least one UE. The UE 10 monitors the common search space and/or the UE-specific search space. The number of CCE aggregation levels supported by the common search space may be smaller than the number of CCE aggregation levels supported by the UE-specific search space. The common search space and the UE-specific search space may be overlapped with each other.

Table 3 shows an example of search spaces. The size of a CCE aggregation level and the number of PDCCH candidates shown in the table are only for an exemplary purpose and the present inventive concept is not limited to the example.

TABLE 3

| Type | Search space | | |
|---|---|---|---|
| | CCE Aggregation Level L [in CCEs] | Size of Search Space [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The UE-specific search space supports CCE aggregation levels of $L \in \{1,2,4,8\}$, and the common search space supports CCE aggregation levels of $L \in \{4,8\}$. The size of a search space is determined by the number of PDCCH candidates and the size of the CCE aggregation level. That is, the size of the search space is integer times of the size of a CCE aggregation level or the number of PDCCH candidates.

The size of the common search space which is the number of CCEs in the common search space may be kept constantly regardless of the number or the size of the CCE aggregation level in the common search space. To achieve this condition, the number of PDCCH candidates in the common search space may depend on the size of the CCE aggregation level in the common search space. By fixing the size of the common search space, the burden of the UE 10 to monitor the common search space can be reduced.

The CCE aggregation levels in the common search space may use a part of the CCE aggregation levels in the UE-specific search space. For example, when the UE-specific search space supports CCE aggregation levels of L∈{1,2,4,8}, the common search space supports CCE aggregation levels of L∈{4,8}.

When the total number of CCEs in the k-th subframe is $N_{CCE,k}$, the search space $S^{(L)}_k$ at the CCE aggregation level L of {1,2,4,8} may be expressed as follows:

$$(Z_k^{(L)} + iL + j) \bmod N_{CCE,k} \quad \text{[Equation 1]}$$

where $Z^{(L)}_k$ denotes a starting location of the search space, i=0,1, . . . , $M^{(L)}$−1, j=0,1, . . . , L−1, $M^{(L)}$ denotes the number of PDCCH candidates in the search space, and 'mod' denotes a modulo operation. The starting location is a location where the first PDCCH candidate is located in the search space. Within the search space, the UE 10 determines whether a PDCCH is a desired one by decoding the PDCCH candidates by the unit of a CCE aggregation level starting from the starting location. The modulo operation means cyclic search within a CCE set.

The starting location of the UE-specific search space may be varied for each subframe or a UE. The starting location of the UE-specific search space may be determined in every subframe. For example, the hash function for the starting point $Z^{(L)}_k$ may be expressed as follows:

$$Z_k^{(L)} = L(Y_k \bmod \lfloor N_{CCE,k}/L \rfloor), Y_k = (A \cdot Y_{k-1}) \bmod D \quad \text{[Equation 2]}$$

where $Y_{-1}$ denotes a constant related to UE-specific identifier, A=39827, D=65537, and $\lfloor a \rfloor$ is a maximum integer smaller than 'a'.

In the common search space, the starting location of the search space is the same for all UEs 10 in a cell. For example, the starting location may be set to zero for two CCE aggregation levels of L=4 and L=8. This means that the starting location of the common search space is the same for all subframes.

In the common search space or the UE-specific search space, at least one PDCCH carrying a specific DCI may be restricted to be monitored on a fixed start location at a CCE aggregation level. It means that PDCCHs carrying different DCI in the common search space can be restricted to start on different starting location at each CCE aggregation level. The different starting locations may be configured not to overlap with each other with respect to the maximum CCE aggregation level. For example, a PDCCH carrying system information is monitored by starting on CCE #0 at the CCE aggregation level 4 in the common search space and CCE #0 at CCE aggregation level 8 in the common search space. A PDCCH carrying information on random access response is monitored by starting on CCE #8 at the CCE aggregation level 4 in the common search space and CCE #8 at CCE aggregation level 8 in the common search space. The system information and the information on random access response may use the same DCI format which has the same payload size.

Figure 17:
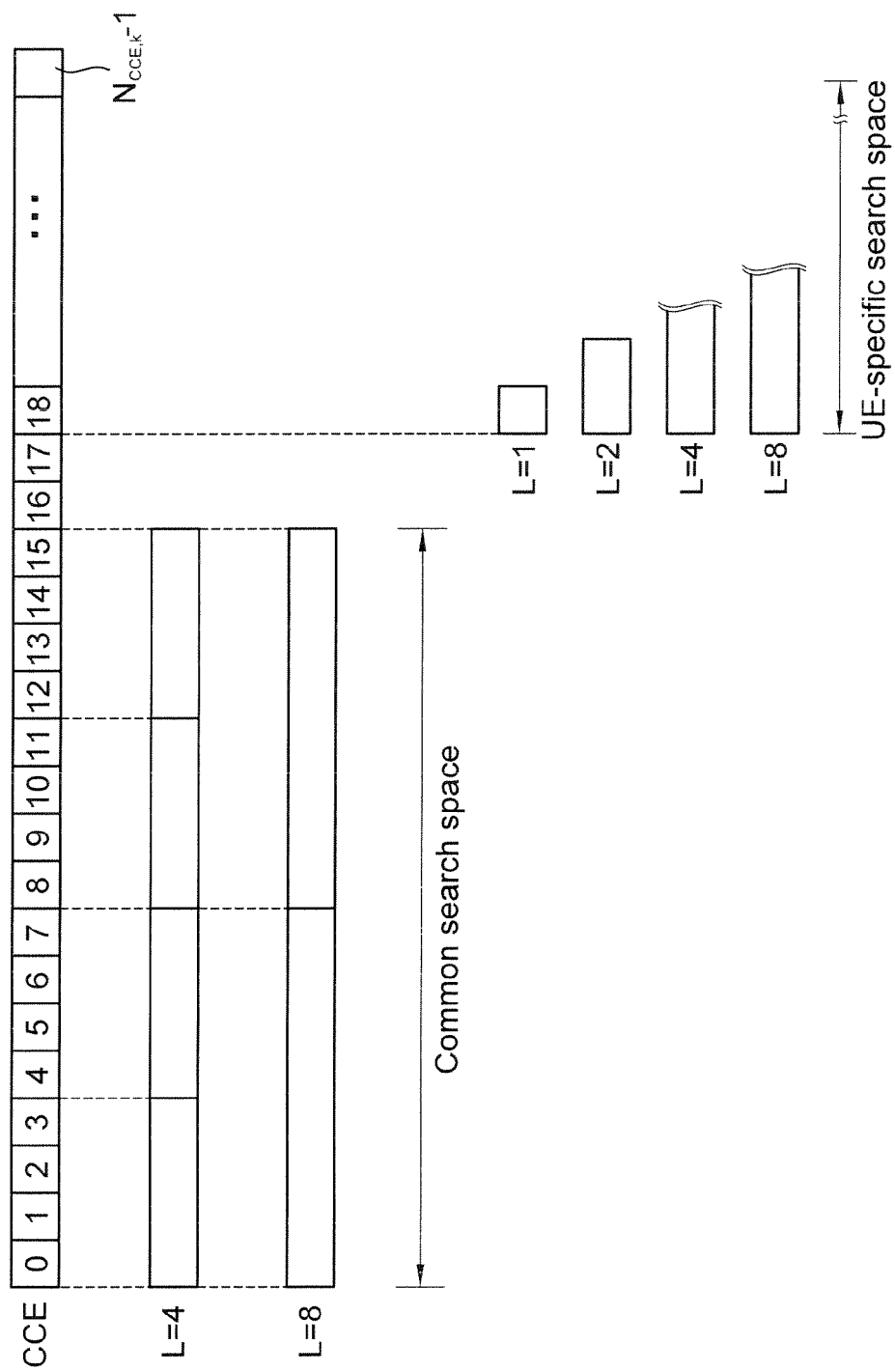
FIG. 17 shows control channel monitoring in a search space.

Referring to FIG. 17, showing control channel monitoring in a search space, a UE 10 determines a size of a control region, i.e., the size of a CCE set, to be monitored on each subframe based on the PCFICH. On the logical CCE set where the total number of CCEs is $N_{CCE,k}$, the UE 10 monitors one common search space at each of CCE aggregation levels 4 and 8, and one UE-specific search space at each of CCE aggregation levels 1, 2, 4 and 8. In the common search space where the CCE aggregation level is L=4, the UE 10 attempts blind decoding for four PDCCH candidates. In the common search space where the CCE aggregation level is L=8, the UE 10 attempts blind decoding for two PDCCH candidates.

The starting location of the common search space is set to the beginning of CCEs, i.e., $Z^{(L)}_k$=0, and the starting location of the UE-specific search space is set as $Z^{(L)}_k$=18, and thus, the common search space and the UE-specific search space are not overlapped with each other. However, the common search space and the UE-specific search space may be overlapped with each other. Accordingly, the starting location of the UE-specific search space may be located within the common search space.

The starting location of the common search space is the same for all UEs 10 in a cell. The starting location of the common search space may be same for all cells or may be different for each cell. Therefore, a different starting location of the common search space may be set for each cell for randomization of inter-cell interference. The starting location of the common search space may have been previously set between the BS 20 and the UE 10, or may be informed to the UE by the BS through RRC signaling or system information.

A search space for searching for a PDCCH is defined, and the search space is divided into a UE-specific search space and a common search space. Therefore, the BS 20 allocates common control information, which should be received by all the UEs 10 in the cell, on the common search space, and a UE attempts blind decoding for the common control information only within the common search space whose range and location are known to the UE. Therefore, the number of decoding attempts may be reduced.

Figure 18:
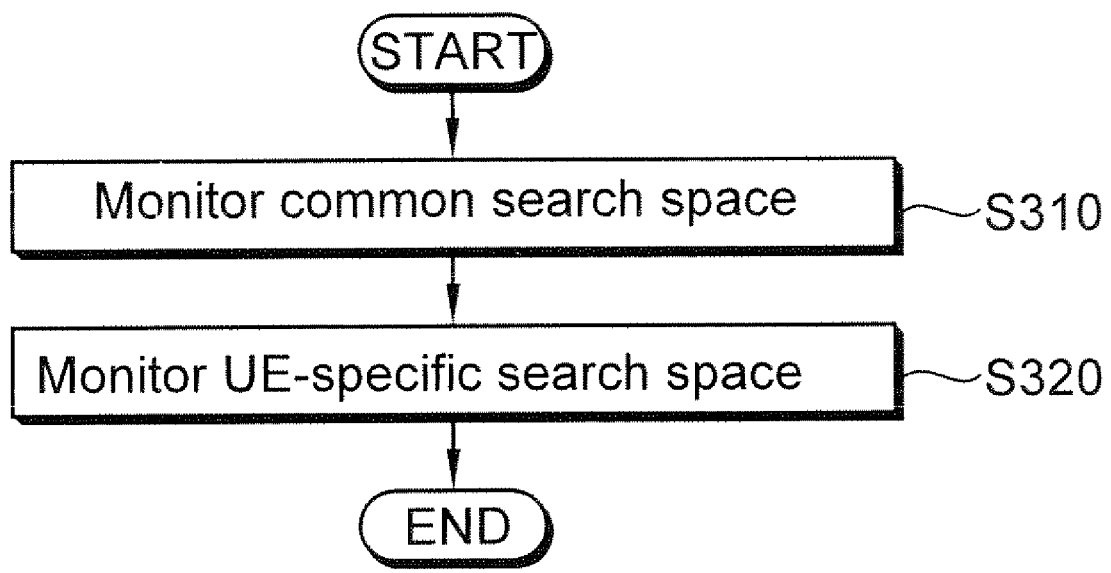
FIG. 18 is a flowchart illustrating monitoring a control channel according to an embodiment of the present invention.

Referring to FIG. 18 illustrating monitoring a control channel according to an embodiment of the present invention, in S310, the UE 10 monitors a common search space at each of common CCE aggregation levels in a subframe. In S320, the UE 10 monitors a UE-specific search space at each of UE-specific CCE aggregation levels in the subframe. The starting location of the common search space may be same for all UEs 10 in a cell, and the starting location of the UE-specific search space may be UE-specific in the cell. The starting location of the common search space may be set to zero. The starting location of the UE-specific search space may be determined in every subframe. The number of the common CCE aggregation levels may be smaller than that of the UE-specific CCE aggregation levels.

Figure 19:
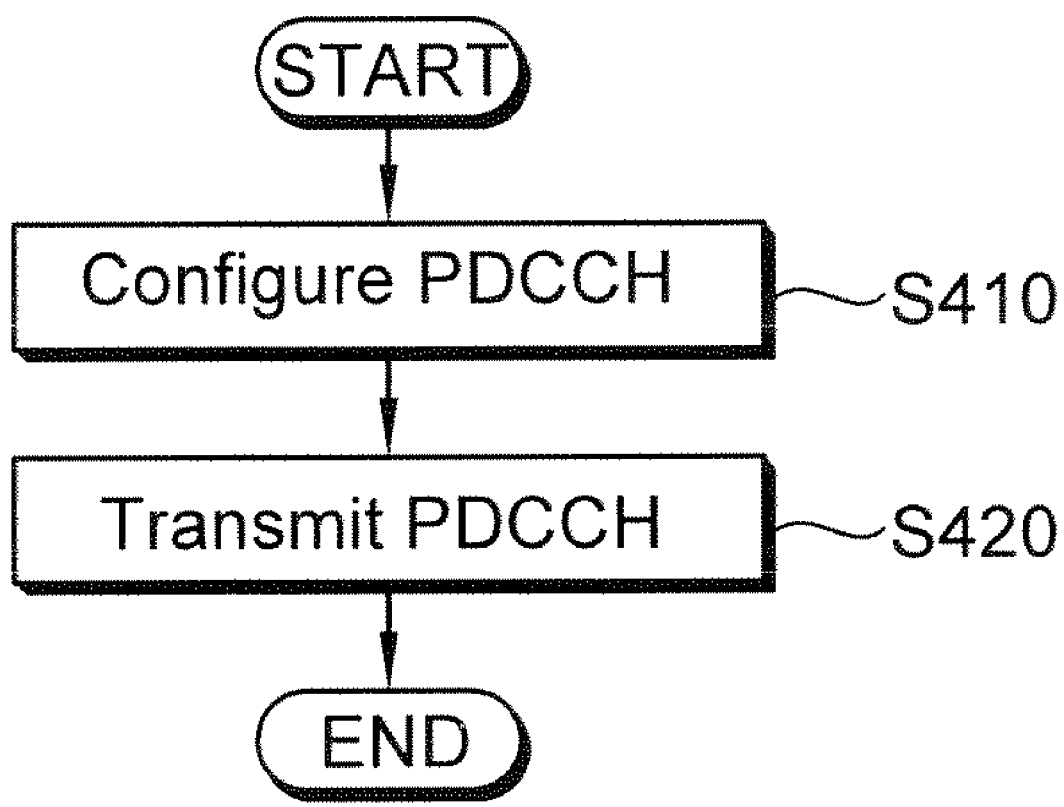
FIG. 19 is a flowchart illustrating transmitting control information on a PDCCH according to an embodiment of the present invention.

Referring to FIG. 19 illustrating transmitting control information on a PDCCH according to an embodiment of the present invention, in S410, the BS 20 configures common control information on the PDCCH in a common search space. In S420, the BS 20 transmits the common control information on the PDCCH. The common search space may be monitored by all UEs 10 in a cell. The BS 20 further transmits UE-specific control information on a PDCCH in a UE-specific search space. The UE-specific search space may be monitored by at least one UE 10 which receives the UE-specific control information.

Figure 20:
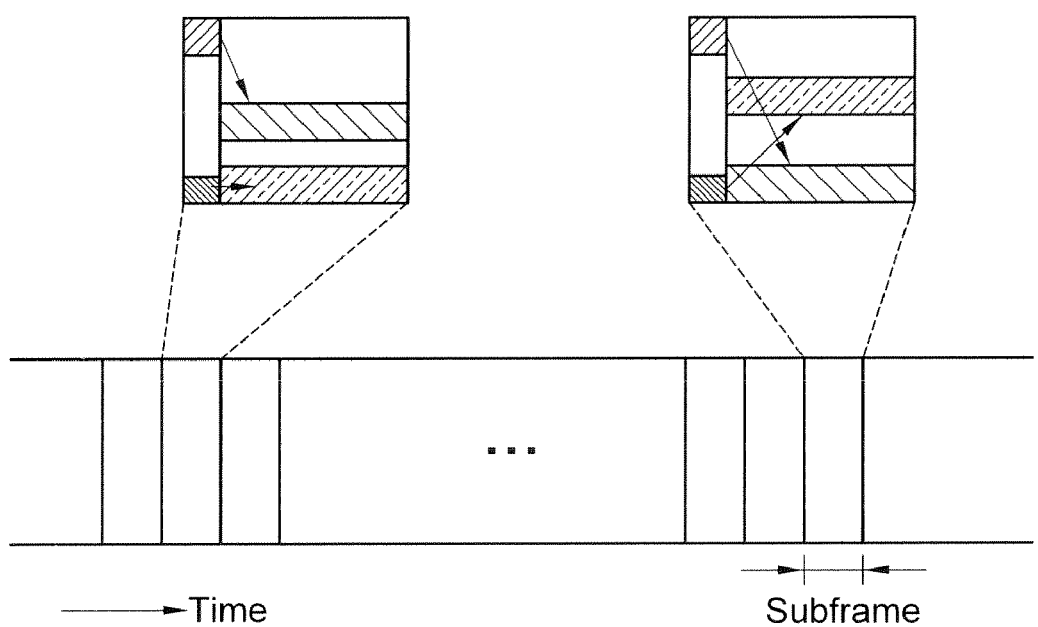
FIG. 20 illustrates monitoring a control channel according to an embodiment of the present invention

Referring to FIG. 20, illustrating monitoring a control channel, at least one PDCCH carrying some common control information may have restricted starting location in a common search space of a subframe. For example, a SI-PDCCH for system information is restricted to start first CCE in the common search space and a RA-PDCCH for a random access response is restricted to start last CCE in the common search space. A UE 10 searches for the SI-PDCCH starting at the first CCE and the RA-PDCCH starting at the last CCE. When the SI-RNTI is found, the UE 10 receives system information on the PDSCH indicated by the SI-PDCCH. When the RA-RNTI is found, the UE 10 receives the random access response on the PDSCH indicated by the RA-PDCCH.

The restricted starting location may be given at each CCE aggregation level. The different starting locations may be configured not to overlap with each other with respect to the maximum CCE aggregation level. For example, the SI-PDCCH is monitored by starting on CCE #0 at the CCE aggregation level 4 in the common search space and CCE #0 at CCE aggregation level 8 in the common search space. The RA-PDCCH is monitored by starting on CCE #8 at the CCE aggregation level 4 in the common search space and CCE #8 at CCE aggregation level 8 in the common search space.

There are various DCI formats. Payload sizes of the DCI formats may be different. To reduce the number of decoding attempts, restrictions may be given for a specific DCI format. When DCI format 1C is used to indicate system information and/or a random access response, the starting locations of the SI-PDCCH and the RA-PDCCH are fixed in the common search space. The starting location of the SI-PDCCH may not overlap with the starting location of the RA-PDCCH. Although it is shown that SI-PDCCH and RA-PDCCH have restricted starting location in the common search space, restriction can be applied to other common control information.

Figure 21:
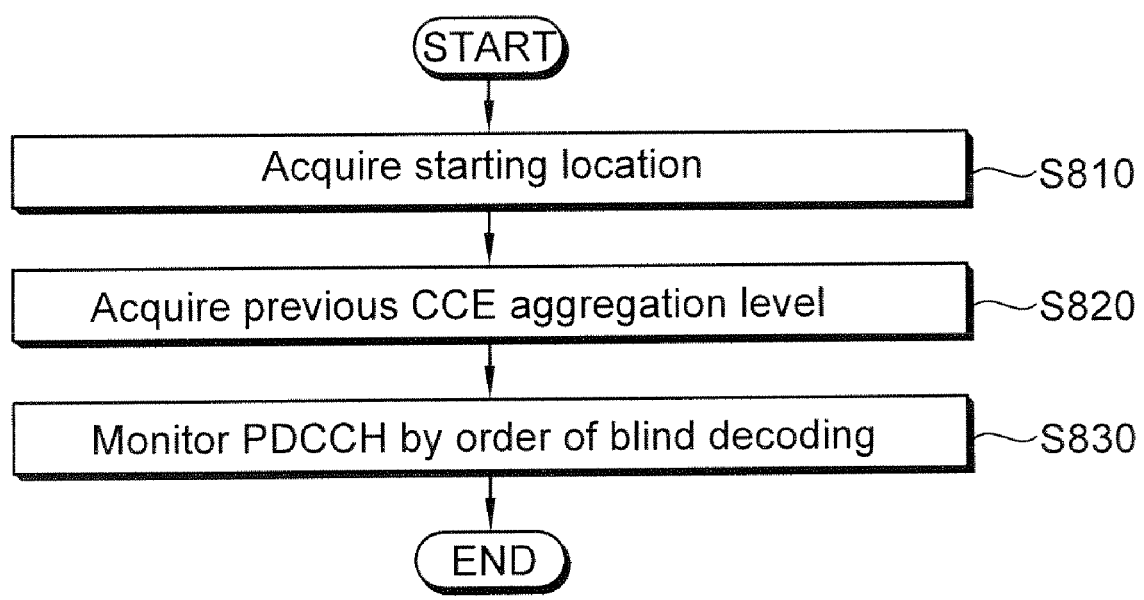
FIG. 21 is a flowchart illustrating monitoring a control channel according to an embodiment of the present invention.

Referring to FIG. 21 illustrating monitoring a control channel according to an embodiment of the present invention, in S810, the UE 10 acquires a staring location of a search space. The search space may be a common search space or a UE-specific search space.

In S820, the UE 10 acquires a previous CCE aggregation level for its own PDCCH which is found in a previous subframe. If the previous CCE aggregation level does not exist, the previous CCE aggregation level may be a CCE aggregation level acquired from a BS 20 by a RRC signaling. Alternatively, the previous CCE aggregation level may be a predetermined basic CCE aggregation level.

In S830, the UE 10 monitors PDCCHs according to the order of blind decoding. In other words, the blind decoding is sequentially performed based on the previous CCE aggregation level. The previous CCE aggregation level is a criterion to select a CCE aggregation level in the current subframe and may also be called as a basic CCE aggregation level. Blind decoding is first performed at the previous CCE aggregation level. If no PDCCH is detected at the previous CCE aggregation level, blind decoding is then performed at an aggregation level contiguous with the previous CCE aggregation level. Blind decoding may be performed at all available CCE aggregation levels or at a part of the available CCE aggregation levels.

The CCE aggregation level is determined by path loss and shadowing in the wireless channel. The variation of the wireless channel is generally not large. When the variation of the wireless channel is small, current CCE aggregation level may be same as the previous CCE aggregation level. Accordingly, the number of decoding attempts can be reduced if the UE 10 performs blind decoding first at the previous CCE aggregation level and then performs blind decoding at the contiguous CCE aggregation level.

When the PDCCH is not monitored during a period or the PDCCH is not detected during the period, the UE 10 can try to monitor PDCCH according to a predetermined basic blind decoding order. If the PDCCH is successfully detected, the CCE aggregation level for the successful PDCCH is first applied to the blind decoding of the next subframe.

An example of the blind decoding order for four CCE aggregation levels {1,2,4,8} is shown in table 4.

TABLE 4

| previous CCE aggregation level | blind decoding order at current subframe |
|---|---|
| 1 | 1→2→4→8 |
| 2 | 2→1→4→8 or 2→4→1→8 |
| 4 | 4→2→8→1 or 4→8→2→1 |
| 8 | 8→4→2→1 |

Another example of the blind decoding order for four CCE aggregation levels {1,2,4,8} is shown in table 5. Blind decoding is performed at one contiguous CCE aggregation level.

TABLE 5

| previous CCE aggregation level | blind decoding order at current subframe |
|---|---|
| 1 | 1→2 |
| 2 | 2→1 or 2→4 |
| 4 | 4→2 or 4→8 |
| 8 | 8→4 or 8→1 |

In another embodiment to determine the blind decoding order, a first selected CCE aggregation level in a subframe can be set to a basic CCE aggregation level. Blind decoding is sequentially performed at contiguous CCE aggregation levels with respect to the basic CCE aggregation level. The first selected CCE aggregation level is selected by a UE 10 or informed by a BS 20.

An example of the blind decoding order for four CCE aggregation levels {1,2,4,8} is shown in table 6. Blind decoding is performed at one contiguous CCE aggregation level.

TABLE 6

| first CCE aggregation level | blind decoding order at current subframe |
|---|---|
| 1 | 1→2 |
| 2 | 2→1 or 2→4 |
| 4 | 4→2 or 4→8 |
| 8 | 8→4 or 8→1 |

Another example of the blind decoding order for four CCE aggregation levels {1,2,4,8} is shown in table 7. Blind decoding is performed at two contiguous CCE aggregation levels.

TABLE 7

| first CCE aggregation level | blind decoding order at current subframe |
|---|---|
| 1 | 1→2→4 |
| 2 | 2→1→4 or 2→4→1 or 2→4→8 |
| 4 | 4→2→8 or 4→8→2 or 4→8→1 |
| 8 | 8→4→2 |

In still another embodiment to determine the blind decoding order, there is little difference between the current CCE aggregation level at the current subframe and the previous CCE aggregation level at the previous subframe although the channel condition may vary. When the channel condition is sequentially changed, the number of CCE aggregation levels in the current subframe may be restricted according to the previous CCE aggregation level, as shown in table 8.

TABLE 8

| previous CCE aggregation level | blind decoding order at current subframe |
|---|---|
| 1 | 1→2→4→8 |
| 2 | 2→1→4→8 or 2→4→1→8 |
| 4 | 4→2→8 or 4→8→2 |
| 8 | 8→4 |

The number of decoding attempts for monitoring a downlink control channel may be reduced. Overheads according to the blind decoding are reduced, and time taken for a UE 10 to search for a downlink control channel is reduced. Thus, battery consumption of the UE 10 is reduced and performance of the communication may be improved.

All the functions described above may be performed by a processor such as a microprocessor, controller, microcontroller, application specific integrated circuit (ASIC), and the like operated based on software, a program code, or the like coded to perform the functions. A design, development, and implementation of the code will be apparent to those skilled in the art based on the description of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of monitoring a physical downlink control channel (PDCCH) in a wireless communication system, the method comprising:
   monitoring a set of PDCCH candidates for a search space in a subframe that comprises a slot that comprises a plurality of orthogonal frequency division multiplexing (OFDM) symbols in a time domain and a plurality of subcarriers in a frequency domain,
   wherein:
   the subframe further comprises a control region for transmitting control information, the control region comprising a set of control channel elements (CCEs);
   the search space comprises a contiguous set of CCEs classified into a common search space and a UE-specific search space;
   the common search space is monitored by all user equipments (UEs) in a cell and the UE-specific search space is monitored by at least one UE in the cell;
   locations for the PDCCH candidates for the search space are determined based on a CCE aggregation level; and
   a number of CCE aggregation levels for the common search space is smaller than a number of CCE aggregation levels for the UE-specific search space.

2. The method of claim 1, wherein a portion of the plurality of OFDM symbols and subcarriers in the slot makes up a resource block, the resource block comprising resource elements in the portion.

3. The method of claim 1, wherein a size of the search space is defined by the size of the CCE aggregation level and a number of the PDCCH candidates for the search space.

4. The method of claim 1, wherein the starting location of the common search space is fixed.

5. The method of claim 1, wherein the starting location of the common search space is set to zero.

6. The method of claim 1, wherein a starting location to search common control information is restricted in the common search space.

7. The method of claim 6, wherein a starting location to search first common control information and a starting location to search second common control information are restricted in the common search space.

8. The method of claim 7, wherein the starting location to search the first common control information is different from the starting location to search the second common control information.

9. The method of claim 1, wherein the common search space and the UE-specific search space overlap with each other.

10. A user equipment for monitoring a physical downlink control channel (PDCCH), the user equipment comprising:
   a radio frequency (RF) unit for receiving a radio signal; and
   a processor coupled with the RF unit and configured to:
      monitor a common search space at each of common control channel element (CCE) aggregation levels in a subframe that comprises a slot that comprises a plurality of orthogonal frequency division multiplexing (OFDM) symbols in a time domain and a plurality of subcarriers in a frequency domain, wherein the subframe further comprises a control region for transmitting control information, the control region comprising a set of CCEs, and the common search space comprising a contiguous set of CCEs is monitored by all user equipments (UEs) in a cell; and
      monitor a UE-specific search space at each of UE-specific CCE aggregation levels in the subframe, wherein the UE-specific search space is monitored by at least one UE in the cell,
   wherein locations for PDCCH candidates for a search space are determined based on a CCE aggregation level,
   wherein a number of aggregation levels for the common space is smaller than a number of CCE aggregation levels for the UE-specific search space.

11. The user equipment of claim 10, wherein the starting location of the common search space is fixed.

12. The user equipment of claim 10, wherein the starting location of the common search space is set to zero.

13. The user equipment of claim 10, wherein locations for the PDCCH candidates for the search space occur every K CCEs, where K is a size of a CCE aggregation level.

14. The user equipment of claim 10, wherein a size of the search space is defined by the size of the CCE aggregation level and a number of the PDCCH candidates for the search space.

15. The user equipment of claim 10, wherein the common search space and the UE-specific search space overlap with each other.

16. The method of claim 1, wherein a starting location of the common search space is the same for all the UEs in the cell, and a starting location of the UE-specific search space is determined in every subframe.

17. The user equipment of claim 10, wherein a starting location of the common search space is the same for all the UEs in the cell, and a starting location of the UE-specific search space is determined in every subframe.

* * * * *